United States Patent
Zionpour et al.

(10) Patent No.: US 11,687,216 B2
(45) Date of Patent: Jun. 27, 2023

(54) DIGITAL PROCESSING SYSTEMS AND METHODS FOR DYNAMICALLY UPDATING DOCUMENTS WITH DATA FROM LINKED FILES IN COLLABORATIVE WORK SYSTEMS

(71) Applicant: MONDAY.COM LTD., Tel Aviv (IL)

(72) Inventors: Ron Zionpour, Kfar Sirkin (IL); Tal Haramati, Tel Aviv (IL); Guy Greenhut, Ramat Gan (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/565,534

(22) Filed: Dec. 30, 2021

(65) Prior Publication Data
US 2022/0222425 A1     Jul. 14, 2022

Related U.S. Application Data

(63) Continuation of application No. PCT/IB2021/062440, filed on Dec. 29, 2021, which
(Continued)

(51) Int. Cl.
*G06F 3/0484*     (2022.01)
*G06F 40/166*     (2020.01)
(Continued)

(52) U.S. Cl.
CPC .......... *G06F 3/0484* (2013.01); *G06F 3/0481* (2013.01); *G06F 3/0483* (2013.01);
(Continued)

(58) Field of Classification Search
CPC .......................... G06F 40/166; G06F 3/04842
See application file for complete search history.

(56) References Cited

U.S. PATENT DOCUMENTS

| 4,972,314 A | 11/1990 | Getzinger et al. |
| 5,220,657 A | 6/1993 | Bly et al. |

(Continued)

FOREIGN PATENT DOCUMENTS

| CA | 2 828 011 A1 | 9/2012 |
| CN | 103064833 A | 4/2013 |

(Continued)

OTHER PUBLICATIONS

Alessio et al., Monday.com Walkthrough 2018\All Features, Platforms & Thoughts, Mar. 1, 2018, pp. 1-55, 2018.
(Continued)

*Primary Examiner* — Asher D Kells
(74) *Attorney, Agent, or Firm* — Finnegan, Henderson, Farabow, Garrett & Dunner, LLP

(57) ABSTRACT

Systems, methods, and computer-readable media for automatically updating an electronic word processing document based on a change in a linked file and vice versa are disclosed. The systems and methods may involve accessing the electronic word processing document; identifying in the electronic word processing document a variable data element; accessing the external file identified in the link; pulling, from the external file, first replacement data corresponding to the current data; replacing the current data in the electronic word processing document with the first replacement data; identifying a change to the variable data element in the electronic word processing document; upon identification of the change, accessing the external file via the link; and updating the external file to reflect the change to the variable data element in the electronic word processing document.

25 Claims, 22 Drawing Sheets

Related U.S. Application Data is a continuation-in-part of application No. PCT/IB2021/000297, filed on Apr. 28, 2021, and a continuation-in-part of application No. PCT/IB2021/000090, filed on Feb. 11, 2021, and a continuation-in-part of application No. PCT/IB2021/000024, filed on Jan. 14, 2021.

(60) Provisional application No. 63/273,448, filed on Oct. 29, 2021, provisional application No. 63/273,453, filed on Oct. 29, 2021, provisional application No. 63/233,925, filed on Aug. 17, 2021.

(51) Int. Cl.

| | |
|---|---|
| *G06F 40/169* | (2020.01) |
| *H04M 1/72436* | (2021.01) |
| *G06K 7/14* | (2006.01) |
| *H04L 51/046* | (2022.01) |
| *H04L 51/10* | (2022.01) |
| *G06F 40/134* | (2020.01) |
| *G06F 21/62* | (2013.01) |
| *H04N 1/44* | (2006.01) |
| *G06F 40/109* | (2020.01) |
| *G06F 3/04817* | (2022.01) |
| *G06T 13/00* | (2011.01) |
| *G06F 40/186* | (2020.01) |
| *G06F 40/30* | (2020.01) |
| *G06F 40/197* | (2020.01) |
| *G06F 40/117* | (2020.01) |
| *G06F 40/106* | (2020.01) |
| *G06Q 10/10* | (2023.01) |
| *G06F 16/176* | (2019.01) |
| *H04L 9/40* | (2022.01) |
| *H04L 65/401* | (2022.01) |
| *G06F 40/103* | (2020.01) |
| *G06F 3/0485* | (2022.01) |
| *G06F 3/0481* | (2022.01) |
| *G06F 3/04847* | (2022.01) |
| *G06F 11/14* | (2006.01) |
| *G06F 16/18* | (2019.01) |
| *G06F 3/0486* | (2013.01) |
| *G06F 40/114* | (2020.01) |
| *G06F 3/0483* | (2013.01) |
| *G06F 3/04842* | (2022.01) |

(52) U.S. Cl.
CPC .......... *G06F 3/0485* (2013.01); *G06F 3/0486* (2013.01); *G06F 3/04817* (2013.01); *G06F 3/04847* (2013.01); *G06F 11/1469* (2013.01); *G06F 16/176* (2019.01); *G06F 16/1774* (2019.01); *G06F 16/1873* (2019.01); *G06F 21/629* (2013.01); *G06F 21/6209* (2013.01); *G06F 21/6218* (2013.01); *G06F 40/103* (2020.01); *G06F 40/106* (2020.01); *G06F 40/109* (2020.01); *G06F 40/114* (2020.01); *G06F 40/117* (2020.01); *G06F 40/134* (2020.01); *G06F 40/166* (2020.01); *G06F 40/169* (2020.01); *G06F 40/186* (2020.01); *G06F 40/197* (2020.01); *G06F 40/30* (2020.01); *G06K 7/1443* (2013.01); *G06Q 10/103* (2013.01); *G06T 13/00* (2013.01); *H04L 51/046* (2013.01); *H04L 51/10* (2013.01); *H04L 63/101* (2013.01); *H04L 63/102* (2013.01); *H04L 65/4015* (2013.01); *H04M 1/72436* (2021.01); *H04N 1/448* (2013.01); *G06F 3/04842* (2013.01); *G06F 2201/84* (2013.01)

(56) References Cited

U.S. PATENT DOCUMENTS

| | | | |
|---|---|---|---|
| 5,479,602 | A | 12/1995 | Baecker et al. |
| 5,517,663 | A | 5/1996 | Kahn |
| 5,632,009 | A | 5/1997 | Rao et al. |
| 5,682,469 | A | 10/1997 | Linnett |
| 5,696,702 | A | 12/1997 | Skinner et al. |
| 5,726,701 | A | 3/1998 | Needham |
| 5,787,411 | A | 7/1998 | Groff et al. |
| 5,880,742 | A | 3/1999 | Rao et al. |
| 5,933,145 | A | 8/1999 | Meek |
| 6,016,438 | A | 1/2000 | Wakayama |
| 6,016,553 | A | 1/2000 | Schneider et al. |
| 6,023,695 | A | 2/2000 | Osborn et al. |
| 6,034,681 | A | 3/2000 | Miller |
| 6,049,622 | A | 4/2000 | Robb et al. |
| 6,088,707 | A * | 7/2000 | Bates .................. G06F 16/957 707/E17.119 |
| 6,108,573 | A | 8/2000 | Debbins et al. |
| 6,111,573 | A | 8/2000 | McComb et al. |
| 6,167,405 | A | 12/2000 | Rosensteel, Jr. et al. |
| 6,169,534 | B1 | 1/2001 | Raffel et al. |
| 6,182,127 | B1 | 1/2001 | Cronin, III et al. |
| 6,185,582 | B1 | 2/2001 | Zellweger et al. |
| 6,195,794 | B1 | 2/2001 | Buxton |
| 6,266,067 | B1 | 7/2001 | Owen et al. |
| 6,275,809 | B1 | 8/2001 | Tamaki et al. |
| 6,330,022 | B1 | 12/2001 | Seligmann |
| 6,377,965 | B1 | 4/2002 | Hachamovitch et al. |
| 6,385,617 | B1 | 5/2002 | Malik |
| 6,460,043 | B1 | 10/2002 | Tabbara et al. |
| 6,496,832 | B2 | 12/2002 | Chi et al. |
| 6,509,912 | B1 | 1/2003 | Moran et al. |
| 6,510,459 | B2 | 1/2003 | Cronin, III et al. |
| 6,522,347 | B1 | 2/2003 | Tsuji et al. |
| 6,527,556 | B1 | 3/2003 | Koskinen |
| 6,567,830 | B1 | 5/2003 | Madduri |
| 6,606,740 | B1 | 8/2003 | Lynn et al. |
| 6,636,242 | B2 | 10/2003 | Bowman-Amuah |
| 6,647,370 | B1 | 11/2003 | Fu et al. |
| 6,661,431 | B1 | 12/2003 | Stuart et al. |
| 6,988,248 | B1 | 1/2006 | Tang |
| 7,027,997 | B1 | 4/2006 | Robinson et al. |
| 7,034,860 | B2 | 4/2006 | Lia et al. |
| 7,043,529 | B1 | 5/2006 | Simonoff |
| 7,054,891 | B2 | 5/2006 | Cole |
| 7,237,188 | B1 | 6/2007 | Leung |
| 7,249,042 | B1 | 7/2007 | Doerr et al. |
| 7,272,637 | B1 | 9/2007 | Himmelstein |
| 7,274,375 | B1 | 9/2007 | David |
| 7,379,934 | B1 | 5/2008 | Forman et al. |
| 7,383,320 | B1 | 6/2008 | Silberstein et al. |
| 7,389,473 | B1 * | 6/2008 | Sawicki ................ G06F 40/123 715/255 |
| 7,415,664 | B2 | 8/2008 | Aureglia et al. |
| 7,417,644 | B2 | 8/2008 | Cooper et al. |
| 7,461,077 | B1 | 12/2008 | Greenwood |
| 7,489,976 | B2 | 2/2009 | Adra |
| 7,617,443 | B2 | 11/2009 | Mills et al. |
| 7,685,152 | B2 | 3/2010 | Chivukula et al. |
| 7,707,514 | B2 | 4/2010 | Forstall et al. |
| 7,710,290 | B2 | 5/2010 | Johnson |
| 7,770,100 | B2 | 8/2010 | Chamberlain et al. |
| 7,827,476 | B1 | 11/2010 | Roberts et al. |
| 7,827,615 | B1 | 11/2010 | Allababidi |
| 7,916,157 | B1 | 3/2011 | Kelley et al. |
| 7,921,360 | B1 * | 4/2011 | Sundermeyer ........ G06F 40/166 715/255 |
| 7,954,064 | B2 | 5/2011 | Forstall et al. |
| 8,046,703 | B2 | 10/2011 | Busch et al. |
| 8,078,955 | B1 | 12/2011 | Gupta |
| 8,082,274 | B2 | 12/2011 | Steinglass et al. |
| 8,108,241 | B2 | 1/2012 | Shukoor |
| 8,136,031 | B2 | 3/2012 | Massand |
| 8,151,213 | B2 | 4/2012 | Weitzman et al. |
| 8,223,172 | B1 | 7/2012 | Miller et al. |
| 8,286,072 | B2 | 10/2012 | Chamberlain et al. |

(56) References Cited

U.S. PATENT DOCUMENTS

| | | |
|---|---|---|
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater, Jr. |
| 8,635,520 B2 | 1/2014 | Christiansen et al. |
| 8,677,448 B1 | 3/2014 | Kauffman et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 * | 9/2014 | Kwiatkowski ........ G06F 40/166 707/613 |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,063,958 B2 | 6/2015 | Müller et al. |
| 9,129,234 B2 | 9/2015 | Campbell et al. |
| 9,159,246 B2 | 10/2015 | Rodriguez et al. |
| 9,172,738 B1 | 10/2015 | daCosta |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,424,545 B1 | 8/2016 | Lee |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,519,699 B1 * | 12/2016 | Kulkarni ............. G06F 16/2471 |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,794,256 B2 | 10/2017 | Kiang et al. |
| 9,798,829 B1 | 10/2017 | Baisley |
| 9,811,676 B1 | 11/2017 | Gauvin |
| 9,866,561 B2 | 1/2018 | Psenka et al. |
| 9,870,136 B2 | 1/2018 | Pourshahid |
| 10,043,296 B2 | 8/2018 | Li |
| 10,067,928 B2 | 9/2018 | Krappe |
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,318,624 B1 | 6/2019 | Rosner et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,546,001 B1 | 1/2020 | Nguyen et al. |
| 10,564,622 B1 | 2/2020 | Dean et al. |
| 10,573,407 B2 | 2/2020 | Ginsburg |
| 10,579,724 B2 | 3/2020 | Campbell et al. |
| 10,587,714 B1 * | 3/2020 | Kulkarni ................. H04L 67/51 |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,733,256 B2 | 8/2020 | Fickenscher et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,010,371 B1 | 5/2021 | Slomka et al. |
| 11,030,259 B2 | 6/2021 | Mullins et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,222,167 B2 | 1/2022 | Gehrmann et al. |
| 11,243,688 B1 | 2/2022 | Remy et al. |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 * | 5/2003 | McInnes ............... G06F 40/174 715/234 |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0139400 A1 | 7/2004 | Allam |
| 2004/0162833 A1 * | 8/2004 | Jones .................... G06F 40/137 |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |

(56) References Cited

U.S. PATENT DOCUMENTS

| | | |
|---|---|---|
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0216830 A1* | 9/2005 | Turner .................. G06F 40/186 715/255 |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0150090 A1* | 7/2006 | Swamidass ............ G06F 40/186 715/230 |
| 2006/0173908 A1 | 8/2006 | Browning et al. |
| 2006/0190313 A1 | 8/2006 | Lu |
| 2006/0212299 A1* | 9/2006 | Law ....................... G06Q 10/10 705/342 |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0233647 A1 | 10/2007 | Rawat et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1* | 3/2008 | Chin ....................... G06Q 10/10 707/999.203 |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1* | 10/2008 | Penner .................. G06F 40/186 707/999.107 |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0248710 A1 | 10/2009 | McCormack et al. |
| 2009/0271696 A1 | 10/2009 | Bailor et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |

(56) References Cited

U.S. PATENT DOCUMENTS

| | | |
|---|---|---|
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287163 A1 | 11/2010 | Sridhar et al. |
| 2010/0287221 A1 | 11/2010 | Battepati et al. |
| 2010/0313119 A1* | 12/2010 | Baldwin ............ G06F 3/04842 715/256 |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez et al. |
| 2011/0225525 A1 | 9/2011 | Chasman et al. |
| 2011/0231273 A1 | 9/2011 | Buchheit |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233150 A1 | 9/2012 | Naim et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Strick et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Strick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2013/0339051 A1 | 12/2013 | Dobrean |
| 2014/0006326 A1 | 1/2014 | Bazanov |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0082525 A1 | 3/2014 | Kass et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao Dv |
| 2014/0214404 A1 | 7/2014 | Kalia et al. |
| 2014/0215303 A1 | 7/2014 | Grigorovitch et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |

(56) References Cited

U.S. PATENT DOCUMENTS

| | | |
|---|---|---|
| 2015/0033149 A1 | 1/2015 | Kuchoor |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0188964 A1 | 7/2015 | Sharma et al. |
| 2015/0212717 A1 | 7/2015 | Nair et al. |
| 2015/0220491 A1* | 8/2015 | Cochrane ............... G06F 40/106 715/209 |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Murayama |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur et al. |
| 2016/0275150 A1 | 9/2016 | Bournonnais et al. |
| 2016/0299655 A1 | 10/2016 | Migos et al. |
| 2016/0308963 A1* | 10/2016 | Kung ............... G06F 16/24565 |
| 2016/0321235 A1 | 11/2016 | He et al. |
| 2016/0321604 A1 | 11/2016 | Imaeda et al. |
| 2016/0335302 A1 | 11/2016 | Teodorescu |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1* | 5/2017 | Ah-Soon ............... G06F 40/18 |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177888 A1 | 6/2017 | Arora et al. |
| 2017/0185668 A1 | 6/2017 | Convertino et al. |
| 2017/0200122 A1 | 7/2017 | Edson et al. |
| 2017/0206366 A1 | 7/2017 | Fay et al. |
| 2017/0212924 A1* | 7/2017 | Semlani ............... G06F 16/2379 |
| 2017/0220813 A1 | 8/2017 | Mullins et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel |
| 2017/0236081 A1 | 8/2017 | Grady Smith et al. |
| 2017/0242921 A1 | 8/2017 | Rota |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0315974 A1* | 11/2017 | Kong ............... G06F 16/972 |
| 2017/0315979 A1 | 11/2017 | Boucher et al. |
| 2017/0324692 A1 | 11/2017 | Zhou |
| 2017/0351252 A1 | 12/2017 | Kleifges et al. |
| 2017/0372442 A1 | 12/2017 | Mejias |
| 2018/0011827 A1* | 1/2018 | Avery ............... G06F 40/103 |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0276417 A1 | 9/2018 | Cerezo |
| 2018/0293217 A1 | 10/2018 | Callaghan |
| 2018/0293669 A1 | 10/2018 | Jackson et al. |

(56) References Cited

U.S. PATENT DOCUMENTS

| | | |
|---|---|---|
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi |
| 2019/0012342 A1 | 1/2019 | Cohn |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1* | 2/2019 | Vora .................. H04L 67/1095 |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0123924 A1 | 4/2019 | Embiricos et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0243879 A1* | 8/2019 | Harley .................. G06F 40/166 |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0192785 A1 | 6/2020 | Chen |
| 2020/0247661 A1 | 8/2020 | Rao et al. |
| 2020/0265112 A1 | 8/2020 | Fox et al. |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1* | 6/2021 | Stokes .................. G06F 40/186 |
| 2021/0192126 A1 | 6/2021 | Gehrmann et al. |
| 2021/0264220 A1 | 8/2021 | Wei et al. |
| 2021/0326519 A1 | 10/2021 | Lin et al. |
| 2022/0221591 A1 | 7/2022 | Smith et al. |

FOREIGN PATENT DOCUMENTS

| | | | |
|---|---|---|---|
| CN | 107123424 A | 9/2017 | |
| CN | 107422666 A | 12/2017 | |
| CN | 107623596 A | 1/2018 | |
| CN | 107885656 A | 4/2018 | |
| CN | 112929172 A | 6/2021 | |
| EP | 3 443 466 B1 | 12/2021 | |
| EP | 3443466 B1 * | 12/2021 | ......... G06F 16/2379 |
| KR | 20150100760 | 9/2015 | |
| WO | WO 2004/100015 A2 | 11/2004 | |
| WO | WO 2006/116580 A2 | 11/2006 | |
| WO | WO 2008109541 A1 | 9/2008 | |
| WO | WO 2017/202159 A1 | 11/2017 | |
| WO | WO 2020/187408 A1 | 9/2020 | |
| WO | WO 2021096944 A1 | 5/2021 | |
| WO | WO 2021144656 A1 | 7/2021 | |
| WO | WO 20211161104 | 8/2021 | |
| WO | WO 2021220058 A1 | 11/2021 | |

OTHER PUBLICATIONS

Rodrigo et al., Project Management with Monday.com: a 101 Introduction; Jul. 22, 2019, pp. 1-21, 2019.

International Search Report and Written Opinion of the International Searching Authority in PCT/IB2020/000658, dated Nov. 11, 2020 (12 pages).

International Search Report in PCT/IB2020/000974, dated May 3, 2021 (19 pages).

International Search Report in PCT/IB2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/IB2020/000024, dated May 3, 2021 (13 pages).

"Pivot table—Wikipedia"; URL: https://en.wikipedia .org/w/index. php?title=Pivot_table&oldid=857163289, originally retrieve on Oct. 23, 2019; retrieved on Jul. 16, 2021.

Vishal Singh, "A Theoretical Framework of a BIM-based Multi-Disciplinary Collaboration Platform", Nov. 5, 2020, Automation in Construction, 20 (2011), pp. 134-144 (Year: 2011).

Edward A. Stohr, Workflow Automation: Overview and Research Issues, 2001, Information Systems Frontiers 3:3, pp. 281-296 (Year: 2001).

International Search Report and Written Opinion of the International Search Authority in PCT/IB2021/000297, dated Oct. 12, 2021 (20 pages).

Dapulse.com "features".extracted from web.archive.or/web/ 2014091818421/https://dapulse.com/features; Sep. 2014 (Year: 2014).

Stephen Larson et al., Introducing Data Mining Concepts Using Microsoft Excel's Table Analysis Tools, Oct. 2015, [Retrieved on

(56) References Cited

OTHER PUBLICATIONS

Nov. 19, 2021], Retrieved from the internet: <URL: https://dl.acm.org/doi/pdf/10.5555/2831373.2831394> 3 Pages (127-129) (Year: 2015).

Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

Sajjad Bahrebar et al., "A Novel Type-2 Fuzzy Logic for Improved Risk Analysis of Proton Exchange Membrane Fuel Cells in Marine Power Systems Application", *Energies*, 11, 721, pp. 1-16, Mar. 22, 2018.

Pedersen et al., "Tivoli: an electronic whiteboard for informal workgroup meetings", Conference on Human Factors in Computing Systems: Proceedings of the Interact '93 and CHI '93 conference on Human factors in computing systems; Apr. 24-29, 1993:391-398. (Year 1993).

Kollmann, Franz, "Realizing Fine-Granular Read and Write Rights on Tree Structured Documents." in the Second International Conference on Availability, Reliability and Security (ARES'07), pp. 517-523. IEEE, 2007. (Year: 2007).

Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).

Peltier, "Clustered and Stacked Column and Bar Charts", Aug. 2011, Peltier Technical Services, Inc., pp. 1-128; (Year: 2011).

Beate List, "An Evaluation of Conceptual Business Process Modelling Languages", 2006, SAC'06, Apr. 23-27, pp. 1532-1539 (Year: 2006).

"Demonstracion en espanol de Monday.com", published Feb. 20, 2019. https://www.youtube.com/watch?v=z0qydTgof1A (Year: 2019).

Desmedt, Yvo, and Arash Shaghaghi, "Function-Based Access Control (FBAC) From Access Control Matrix to Access Control Tensor." In Proceedings of the $8^{th}$ ACM CCS International Workshop on Managing Insider Security Threats, pp. 89-92. (2016).

Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).

Gutwin, C. et al., "Supporting Informal Collaboration in Shared-Workspace Groupware", J. Univers. Comput. Sci., 14(9), 1411-1434 (2008).

Barai, S., et al., "Image Annotation System Using Visual and Textual Features", in: Proceedings of the 16th International Confernce on Distributed Multi-media Systems, pp. 289-296 (2010).

\* cited by examiner

410

| Vacation - March 2022 | | | | | | |
|---|---|---|---|---|---|---|
| Sunday | Monday | Tuesday | Wednesday | Thursday | Friday | Saturday |
| | | 1 | 2<br>Leave DC on Flight 1234 to LAX | 3<br>Explore Los Angeles, Dodger game at 7:00 PM | 4<br>Rent car and drive to Las Vegas, NV | 5<br>Explore Las Vegas |
| 6<br>Drive to Vail, CO | 7<br>Arrive in Vail, CO for a day of skiing | 8<br>Skiing and reservation at spa | 9<br>Flight 5678 to DCA | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 | | |

| Vacation – March 2022 | | | | | | |
|---|---|---|---|---|---|---|
| Sunday | Monday | Tuesday | Wednesday | Thursday | Friday | Saturday |
| | | 1 | 2<br>Leave DC on Flight 1234<br>[ON TIME Gate A5] to LAX | 3<br>Explore Los Angeles. ☀<br>Dodger game at 7:00 PM | 4<br>Rent car and drive to Las Vegas, NV | 5<br>Explore Las Vegas |
| 6<br>Drive to Vail, CO | 7<br>Arrive in Vail, CO 🌨 for a day of skiing | 8<br>Skiing 🌨 and reservation at spa | 9<br>Flight 5678<br>[DELAYED Gate B7] to DCA | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 | | |

2022 New Hire Orientation Schedule

| Date | Task | Speaker | Location & Time |
|---|---|---|---|
| January 2, 2022 | Welcome! | Michelle Jones, CEO | Conf. Room 5A<br><br>9:00 - 9:30 A.M. |
| January 2, 2022 | Review Workplace Policies | Tom Harding, Head of Human Resources | Conf. Room 5A<br><br>9:30 - 10:30 A.M. |
| January 2, 2022 | Tour of Facilities | Jen Smith, Head of Research & Development | Outside Conf. Room 5A<br><br>10:30 - 12:00 P.M. |
| January 3, 2022 | IT Training | Carl Howard, Head of IT | Conf. Room 3B<br><br>9:00 A.M. - 12:00 P.M. |
| January 3, 2022 | Benefits Overview | Sam Miller, Benefits Coordinator | Conf. Room 4C<br><br>9:00 A.M. - 12:00 P.M. |

2022 New Hire Orientation Plan Version 2.0
(Internal Human Resources Only)

| Date | Speaker | Task | Time | Location | Talking Points |
|---|---|---|---|---|---|
| 1/2/2022 | Michelle Jones, CEO | Welcome Speech | 9:00 A.M. - 9:30 A.M. | Conf. Room 5A | Welcome<br><br>Company History<br><br>Company Values |
| 1/2/2022 | Tom Harding, Head of HR | Review Workplace Policies | 9:30 A.M. - 10:30 A.M | Conf. Room 5A | Introduction<br><br>Company Handbook |
| 1/2/2022 | Jen Smith, Head R&D | Tour of Facilities | 10:30 A.M. - 12:00 P.M. | Outside Conf. Room 5A | Cover Equipment in Buildings 7, 10, 11, and 15 |
| 1/3/2022 | Carl Howard, Head of IT | IT Training | 9:00 A.M. - 12:00 P.M. | Conf. Room 3B | Security<br><br>Login Information<br><br>Available Programs |
| 1/4/2022 | Sam Miller, Benefits Coordinator | Benefits Overview | 9:00 A.M. - 12:00 P.M. | Conf. Room 4C | Deadlines<br><br>Medical & Dental<br><br>Retirement Account |

2022 New Hire Orientation Schedule

| Date | Task | Speaker | Location & Time |
|---|---|---|---|
| January 2, 2022 | Welcome! | *Michelle Jones, CEO* | Conf. Room 5A<br><br>9:00 - 9:30 A.M. |
| January 2, 2022 | Review Workplace Policies | Tom Harding, Head of Human Resources | Conf. Room 5A<br><br>9:30 - 10:30 A.M. |
| January 2, 2022 | Tour of Facilities | Jen Smith, Head of Research & Development | Outside Conf. Room 5A<br><br>10:30 - 12:00 P.M. |
| *January 3, 2022* | IT Training | Carl Howard, Head of IT | Conf. Room 3B<br><br>9:00 A.M. - 12:00 P.M. |
| *January 4, 2022* | Benefits Overview | Sam Miller, Benefits Coordinator | Conf. Room 4C<br><br>9:00 A.M. - 12:00 P.M. |

1412 (Michelle Jones, CEO row)
1414 (January 3, 2022 row)
1416 (January 4, 2022 row)

2022 New Hire Orientation Plan Version 2.0
(Internal Human Resources Only)

| Date | Speaker | Task | Time | Location | Talking Points |
|---|---|---|---|---|---|
| 1/2/2022 | Randall James, CTO | Welcome Speech | 9:00 A.M. - 9:30 A.M. | Conf. Room 5A | Welcome<br><br>Company History<br><br>Company Values |
| 1/2/2022 | Tom Harding, Head of HR | Review Workplace Policies | 9:30 A.M. - 10:30 A.M | Conf. Room 5A | Introduction<br><br>Company Handbook |
| 1/2/2022 | Jen Smith, Head R&D | Tour of Facilities | 10:30 A.M. - 12:00 P.M. | Outside Conf. Room 5A | Cover Equipment in Buildings 7, 10, 11, and 15 |
| 1/3/2022 | Carl Howard, Head of IT | IT Training | 9:00 A.M.- 12:00 P.M. | Conf. Room 3B | Security<br><br>Login Information<br><br>Available Programs |
| 1/4/2022 | Sam Miller, Benefits Coordinator | Benefits Overview | 9:00 A.M. - 12:00 P.M. | Conf. Room 4C | Deadlines<br><br>Medical & Dental<br><br>Retirement Account |

1512A — (points to row 1)
1514A — (points to row 4, 1/3/2022)
1516A — (points to row 5, 1/4/2022)

2022 New Hire Orientation Schedule

| Date | Task | Speaker | Location & Time |
|---|---|---|---|
| January 2, 2022 | Welcome! | *Randall James, CTO* | Conf. Room 5A<br><br>9:00 - 9:30 A.M. |
| January 2, 2022 | Review Workplace Policies | Tom Harding, Head of Human Resources | Conf. Room 5A<br><br>9:30 - 10:30 A.M. |
| January 2, 2022 | Tour of Facilities | Jen Smith, Head of Research & Development | Outside Conf. Room 5A<br><br>10:30 - 12:00 P.M. |
| *January 3, 2022* | IT Training | Carl Howard, Head of IT | Conf. Room 3B<br><br>9:00 A.M. - 12:00 P.M. |
| *January 4, 2022* | Benefits Overview | Sam Miller, Benefits Coordinator | Conf. Room 4C<br><br>9:00 A.M. - 12:00 P.M. |

1512B (Randall James, CTO row)
1514B (January 3, 2022 row)
1516B (January 4, 2022 row)

2022 New Hire Orientation Schedule

| Date | Task | Speaker | Location & Time |
|---|---|---|---|
| January 2, 2022 | Welcome! | *Randall James, CTO* | Conf. Room 5A<br>9:00 - 9:30 A.M. |
| January 2, 2022 | Review Workplace Policies | Tom Harding, Head of Human Resources | Conf. Room 5A<br>9:30 - 10:30 A.M. |
| January 2, 2022 | Tour of Facilities | Jen Smith, Head of Research & Development | Outside Conf. Room 5A<br>10:30 - 12:00 P.M. |
| *January 3, 2022* | Benefits Overview | Sam Miller, Benefits Coordinator | Conf. Room 4C<br>9:00 A.M. - 12:00 P.M. |
| *January 4, 2022* | IT Training | Carl Howard, Head of IT | Conf. Room 3B<br>9:00 A.M. - 12:00 P.M. |

1612A (Welcome! row Speaker)
1616A (January 3, 2022)
1614A (January 4, 2022)

2022 New Hire Orientation Plan Version 2.0
(Internal Human Resources Only)

| Date | Speaker | Task | Time | Location | Talking Points |
|---|---|---|---|---|---|
| 1/2/2022 | Randall James, CTO | Welcome Speech | 9:00 A.M. - 9:30 A.M. | Conf. Room 5A | Welcome<br><br>Company History<br><br>Company Values |
| 1/2/2022 | Tom Harding, Head of HR | Review Workplace Policies | 9:30 A.M. - 10:30 A.M | Conf. Room 5A | Introduction<br><br>Company Handbook |
| 1/2/2022 | Jen Smith, Head R&D | Tour of Facilities | 10:30 A.M. - 12:00 P.M. | Outside Conf. Room 5A | Cover Equipment in Buildings 7, 10, 11, and 15 |
| 1/4/2022 | Carl Howard, Head of IT | IT Training | 9:00 A.M.- 12:00 P.M. | Conf. Room 3B | Security<br><br>Login Information<br><br>Available Programs |
| 1/3/2022 | Sam Miller, Benefits Coordinator | Benefits Overview | 9:00 A.M. - 12:00 P.M. | Conf. Room 4C | Deadlines<br><br>Medical & Dental<br><br>Retirement Account |

1612B — (points to Randall James, CTO row)
1614B — (points to 1/4/2022 row)
1616B — (points to 1/3/2022 row)

FIG. 16B

2022 New Hire Orientation Schedule

1710A

| Date | Task | Speaker | Location & Time |
|---|---|---|---|
| January 2, 2022 | Welcome! | *Randall James, CTO* | Conf. Room 5A<br>9:00 - 9:30 A.M. |
| January 2, 2022 | Review Workplace Policies | Tom Harding, Head of Human Resources | Conf. Room 5A<br>9:30 - 10:30 A.M. |
| January 2, 2022 | Tour of Facilities | Jen Smith, Head of Research & Development | Outside Conf. Room 5A<br>10:30 - 12:00 P.M. |
| *January 3, 2022* | Benefits Overview | Sam Miller, Benefits Coordinator | Conf. Room 4C<br>9:00 A.M. - 12:00 P.M. |
| *January 4, 2022* | IT Training | Carl Howard, Head of IT | Conf. Room 3B<br>9:00 A.M.- 12:00 P.M. |

2022 New Hire Orientation Schedule

1712B   *Randall James, CTO*

Event 2022 New Hire Orientation

Date: January 2, 2022

Task: Welcome Speech

Time: 9:00 – 9:15 A.M.

Location: Conference Room 5A

Talking Points: Welcome, Company History, Company Values

1714B

1716B

| | | Coordinator | 9:00 A.M. - 12:00 P.M. |
|---|---|---|---|
| *January 4, 2022* | IT Training | Carl Howard, Head of IT | Conf. Room 3B<br><br>9:00 A.M.- 12:00 P.M. |

FIG. 17B

DIGITAL PROCESSING SYSTEMS AND METHODS FOR DYNAMICALLY UPDATING DOCUMENTS WITH DATA FROM LINKED FILES IN COLLABORATIVE WORK SYSTEMS

CROSS-REFERENCE TO RELATED APPLICATIONS

This application is based on and claims benefit of priority of International Patent Application No. PCT/IB2021/062440 filed on Dec. 29, 2021, which claims priority to U.S. Provisional Patent Application No. 63/233,925, filed Aug. 17, 2021, U.S. Provisional Patent Application No. 63/273,448, filed Oct. 29, 2021, U.S. Provisional Patent Application No. 63/273,453, filed Oct. 29, 2021, International Patent Application No. PCT/IB2021/000024, filed on Jan. 14, 2021, International Patent Application No. PCT/IB2021/000090, filed on Feb. 11, 2021, and International Patent Application No. PCT/IB2021/000297, filed on Apr. 28, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

One aspect of the present disclosure may be directed to systems, methods, and computer readable media for automatically updating an electronic word processing document based on a change in a linked file and vice versa. The system may include at least one processor configured to: access the electronic word processing document; identify in the electronic word processing document a variable data element, wherein the variable data element may include current data presented in the electronic word processing document and a link to a file external to the electronic word processing document; access the external file identified in the link; pull, from the external file, first replacement data corresponding to the current data; replace the current data in the electronic word processing document with the first replacement data; identify a change to the variable data element in the electronic word processing document; upon identification of the change, access the external file via the link; and update the external file to reflect the change to the variable data element in the electronic word processing document.

BRIEF DESCRIPTION OF THE DRAWINGS

FIG. 4 illustrates an example of an electronic word processing document, consistent with some embodiments of the present disclosure.

FIG. 9A illustrates an example of receiving a selection of the live active icon, consistent with some embodiments of the present disclosure.

FIG. 9B illustrates a second viewing mode, an expanded view of the live application consistent with some embodiments of the present disclosure.

FIG. 11 illustrates an example of an electronic word processing document, consistent with some embodiments of the present disclosure.

FIG. 12 illustrates an example of a file external to an electronic word processing document, consistent with some embodiments of the present disclosure.

FIG. 14 illustrates an example of an electronic word processing document possessing variable data elements, consistent with some embodiments of the present disclosure.

FIG. 15A illustrates an example of replacement data present in a file external to the electronic word processing document corresponding to current data of a variable data element in the electronic word processing document, consistent with some embodiments of the present disclosure.

FIG. 15B illustrates an example of current data of a variable data element in an electronic word processing document being replaced by replacement data from an external file, consistent with some embodiments of the present disclosure.

FIG. 16A illustrates an example of a change to a variable data element in the electronic word processing document, consistent with some embodiments of the present disclosure.

FIG. 16B illustrates an example of a file external to the electronic word processing document being updated to reflect a change to a variable data element in the electronic word processing document, consistent with some embodiments of the present disclosure.

FIG. 17A illustrates an example of a variable data element being selected, consistent with some embodiments of the present disclosure.

FIG. 17B illustrates an example of an iframe, containing information from an external file, being presented in response to a selection of a variable data element, consistent with some embodiments of the present disclosure.

DETAILED DESCRIPTION

Figure 1:
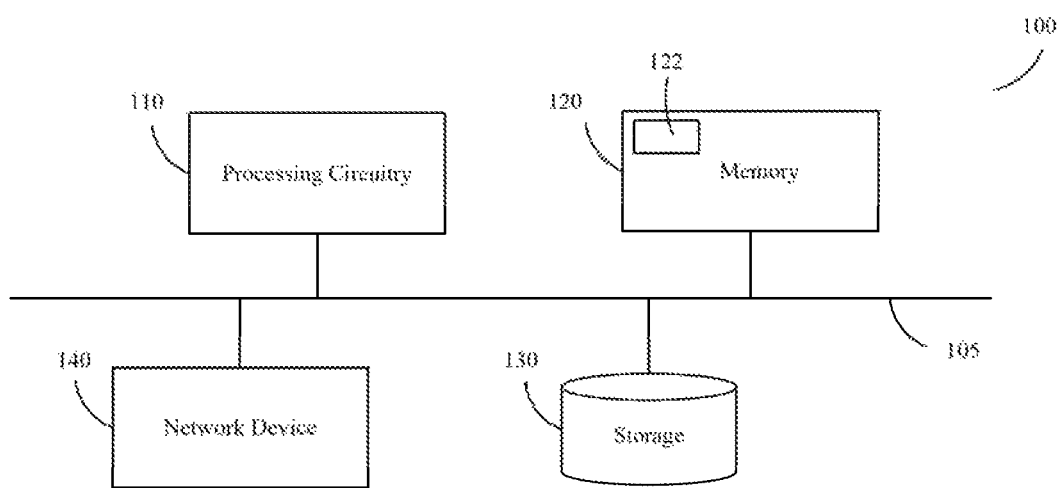
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed, such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
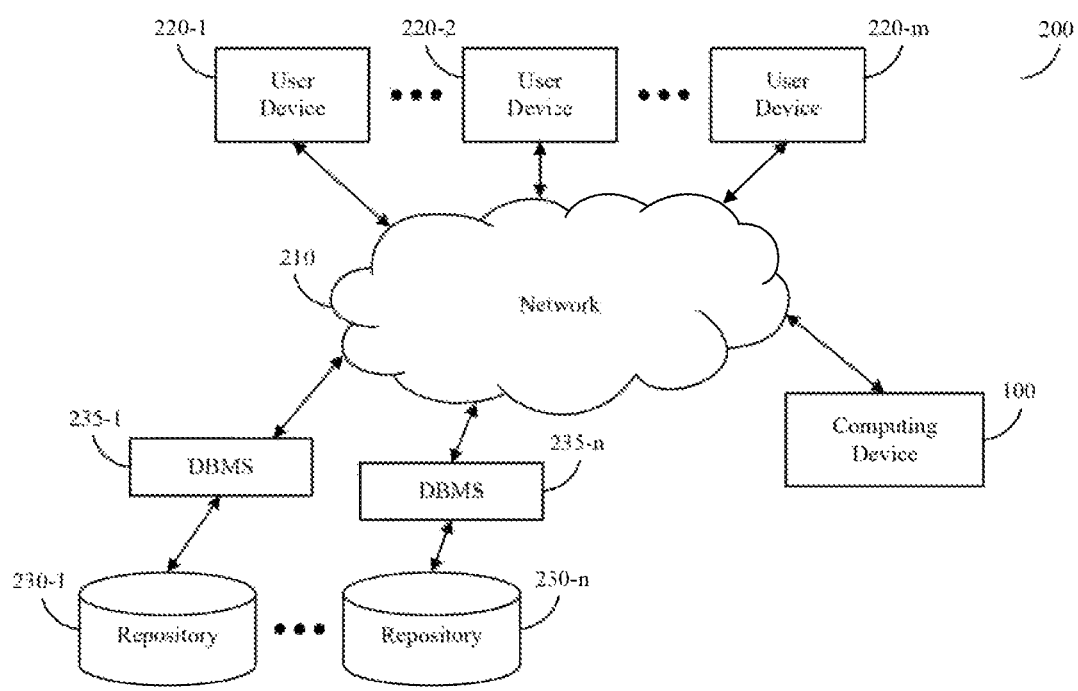
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Figure 3:
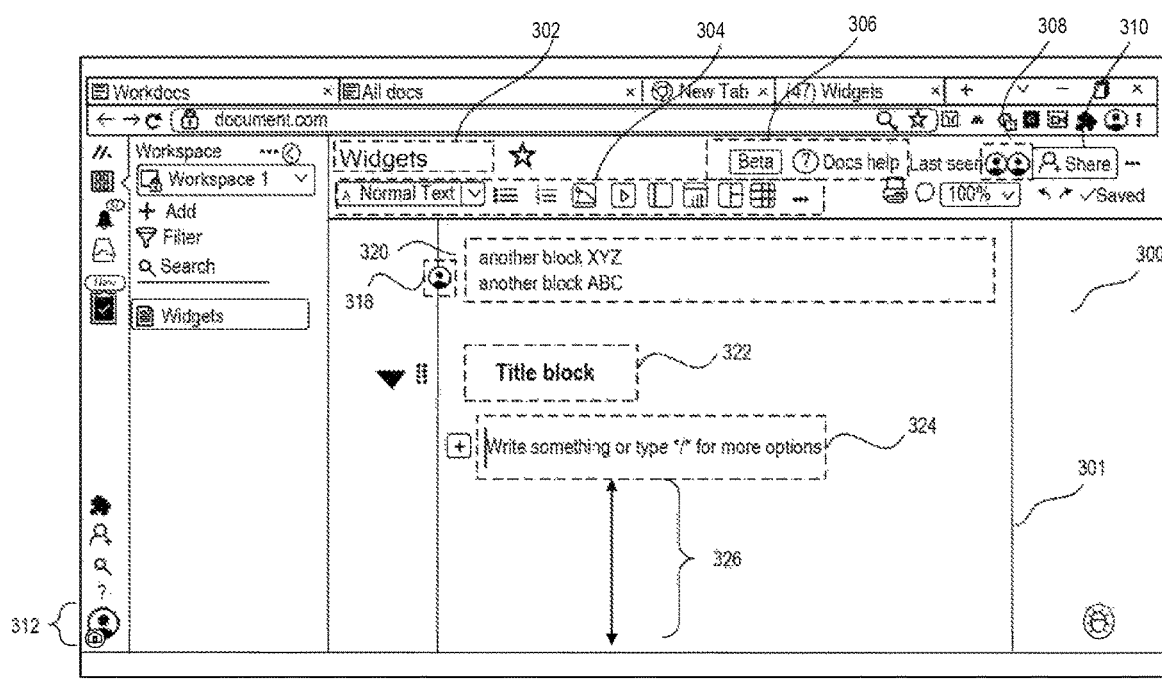
FIG. 3 illustrates an example of an electronic collaborative word processing document, consistent with some embodiments of the present disclosure.

FIG. 3 is an exemplary embodiment of a presentation of an electronic collaborative word processing document 301 via an editing interface or editor 300. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

This disclosure presents various mechanisms for dynamic work systems. Such systems may involve software that enables electronic word processing documents to include dynamic activity. By way of one example, software may enable various dynamic elements from a live application to be reflected in an electronic word processing document. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

In electronic word processing documents, it may be beneficial to employ a myriad of actions for triggering edits to the document when one or more conditions are met. Ensuring that the information in an electronic word processing document is up-to-date when that information is related to dynamically changing applications external to the electronic word processing document can be daunting when the possible changes to the applications could be endless. Therefore, there may be a need for unconventional innovations for ensuring that data in an electronic word processing document is up-to-date and correct through efficient processing and storing methods.

Some disclosed embodiments may involve systems, methods, and computer-readable media for causing dynamic activity in an electronic word processing document. The systems and methods described herein may be implemented with the aid of at least one processor or non-transitory computer readable medium, such as a CPU, FPGA, ASIC, or any other processing structure(s) or storage medium, as described herein. Dynamic activity, as used herein, may include updating, syncing, changing, manipulating, or any other form of altering information associated with an electronic word processing document in response to an alteration of another source of data or any other trigger or threshold being met. Causing dynamic activity may include carrying out instructions to continuously or periodically update information in an electronic word processing document so that the dynamic activity may be updated in real time or in near-real time. For example, causing dynamic activity may include altering text, images, font size, or any other data present in the electronic word processing document in response to continuous or periodic lookups and detecting a threshold for carrying out an activity, as carried out by steps discussed in further detail below. Electronic word processing document (and other variations of the term) as used herein are not limited to only digital files for word processing, but may include any other processing document such as presentation slides, tables, databases, graphics, sound files, video files or any other digital document or file. Electronic word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration. An electronic word processing document may be stored in one or more repositories connected to a network accessible by one or more users through their computing devices.

Some disclosed embodiments may include accessing an electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

For example, as shown in FIG. 2, a user device 220-1 can send a request to access the electronic word processing document to the network 210. The request can then be communicated to the repository 230-1 where the document is stored via the database management system 235-1. The electronic word processing document can be retrieved from the repository 230-1 and transferred through the database management service 235-1 and network 210 for display on the user device 220-1.

By way of example, FIG. 4 illustrates an electronic word processing document 410, consistent with some embodiments of the present disclosure. As shown in the figure, an electronic word processing document 410 can include information regarding an itinerary created by a user of the electronic word processing document 410. For ease of discussion, the electronic word processing document 410 presented in the figure may be representative of displaying a user's itinerary on a calendar, but, as explained above, it is to be understood that the electronic word processing document can be any digital file.

Some disclosed embodiments may include presenting an interface enabling selection of a live application, outside an electronic word processing document, for embedding in the electronic word processing document. An application consistent with the present disclosure may include any set of instructions or commands for carrying out any number of actions or tasks in relation to a source of data or data object. A live application may be an application that continuously or periodically carries out its instructions. For example, a live application may include a packaged set of instructions for retrieving and displaying data or information such as the price of a stock, the weather for a certain location, flight information, or any other information that may be dynamic. As another example, a live application may include a packaged set of instructions for retrieving static or dynamic data from another electronic word processing document for display or manipulation, such as a graphical representation of a pie chart, status of a project, or any other form of data or metadata present in the other electronic word processing document. A live application outside the electronic word processing document may include a live application hosted by a third party platform independent from the electronic word processing document. For example, a live application outside of the electronic word processing document may include a flight tracking application, a weather application, or any other set of instructions or commands for continuously or periodically carrying out any number of actions or tasks in relation to a source of data or data object hosted by a third party platform independent of the platform hosting the electronic document (e.g., an electronic word processing application). Presenting an interface may include rendering a display of information with activatable elements that may enable interaction with the information through a computing device. An interface enabling selection of a live application may include any rendered display of information that may include options corresponding to different live applications with the same or different functionality such that any of the live applications may be selected through an interaction from a computing device associated with a user (e.g., through an activatable element such as a graphical button). For example, the interface may include a graphical user interface rendering a menu option of one or more live applications that may be depicted by indicators (e.g., graphical, alphanumeric, or a combination thereof) that may be configured to select the corresponding application in response to an interaction with a particular indicator, such as with a mouse click or a cursor hover. In response to a selection of a live application, a user may be enabled to upload electronic word processing documents, elect the data to be embedded, enter a website address along with the relevant data to be embedded, or carry out any other tasks via the interface. As another example, the interface may include a graphical user interface allowing the user to manually identify, via textual or any other sensory form (visual, auditory, or tactile) of input, a data source and/or data set for embedding. Embedding in an electronic word processing document may, in some embodiments, include inserting data or a link within an electronic word processing document. Such embedding may be visible at the user interface level or may occur at the code level. In some embodiments, embedding may involve generating a data structure, storing information in the data structure, and rendering a display of information in the data structure within an electronic word processing document at a particular location of the electronic word processing document or in association with the electronic word processing document, as discussed previously. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

A repository may store data such as an array, linked list, object, data field, chart, graph, graphical user interface, video, animation, iframe, HTML element (or element in any other markup language), and/or any other representation of data conveying information from an application. In some embodiments, embedding in the electronic word processing application may include inserting lines of code (e.g., HTML data) into a file or other software instance representing the electronic word processing document. For example, HTML text may represent the electronic word processing document, and embedding the live application within the electronic word processing application may include inserting lines of code into the HTML text to cause the electronic word processing document to source data (e.g., for rendering within the embedded electronic non-word processing application), which may be content data for an associated data structure. In some embodiments, embedding the live application within the electronic word processing application may include inserting code associated with an API or software development toolkit (SDK) into the electronic word processing application and/or electronic word processing document.

For example, embedding an application in the electronic word processing document may occur when a user selects a position, portion, or region of the document (e.g., the first line of the document) and selects an application to be stored and operated from that position, portion, or region of the document. It should be understood that the user can define how the application is embedded relative to the document layout, the data present in the document, or relative to any other features of the document. For example, a user may embed the application to operate from a static position, such as the bottom right corner of a page of the document, or dynamically, such as in-line with the text of a paragraph so that when a position of the paragraph moves, so too does the embedded application. The system may render an options menu for presenting one or more applications for embedding into the electronic word processing document. The system may perform a lookup of available applications to embed (e.g., through a marketplace or through a local repository) and enable a user to select one or more applications for embedding into the electronic word processing document.

Figure 5:
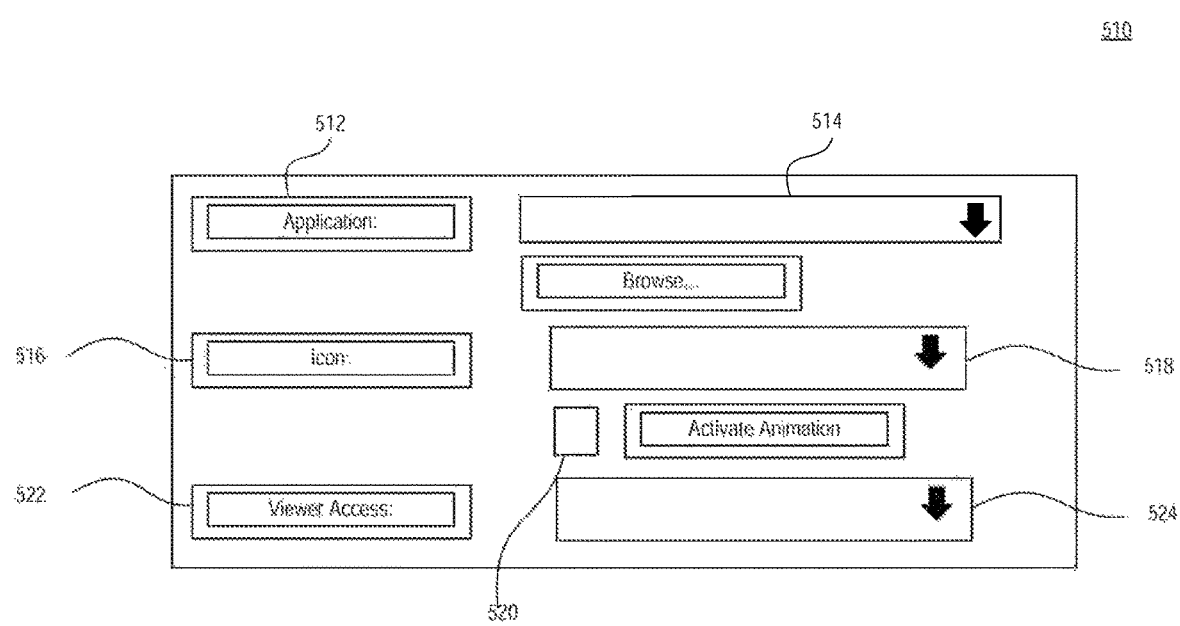
FIG. 5 illustrates an example of an interface enabling selection of a live application, consistent with some embodiments of the present disclosure.

FIG. 5 illustrates an exemplary interface 510 enabling selection of a live application via indicator 512, outside the electronic word processing document, for embedding in the electronic word processing document. While not shown, a user may be presented with an interface displaying different applications that may be selected for embedding in an electronic word processing document. In FIG. 5, a user may be enabled to interact with indicator 512 to confirm a selection of the live application or to change or add a selection of another live application to embed in the electronic word processing document. The live application options may be third party applications hosted by platforms independent of the electronic word processing document. The live applications may be selected for embedding in the document. In FIG. 5, interface 510 may enable selection of a live application 512 by interacting with lookup interface 514 that may enable a user to manually enter text to identify a set of data or information located in a repository, or to upload a new set of information not already stored in a repository. However, it is understood that the selection of a live application is not limited to these embodiments and can be implemented in the any manner as discussed herein or in any manner that allows the user to select an application to act on any selected data for embedding in the word processing document.

Some disclosed embodiments may include embedding, in-line with text of an electronic word processing document, a live active icon representative of a live application. A live active icon as used herein may include symbol, emblem, sign, mark, or any other character graphical representation that may be displayed dynamically (e.g., displayed via animations or displayed according to updates of information). The selection of a live active icon may be automated using automation or logical rules based on the live application or may be selected manually by a user. Embedding a live active icon representative of a live application may include selecting a portion of an electronic word processing document for storing and rendering a graphical representation that may be rendered dynamically and correspond to information associated with a live application, consistent with the methods discussed previously above regarding embedding applications. A live active icon may be said to be representative of a live application in that the live active icon may include a rendering of information related to information in the live application in a reduced or substituted format, discussed in further detail below. Embedding a live active icon in-line with text of the electronic word processing document may include displaying a rendering of a live active icon in a portion of the document that is insertable between alphanumeric characters where characteristics of the live active icon are structured to be compatible with characteristics of the alphanumeric characters retrieved from a data structure in a repository. The data and information stored in the data structure may include the font size, format, color, or any other characteristics of the selected alphanumerical characters. In some embodiments, embedding in-line with text may include sizing a live active icon to correspond to an in-line text font size. Sizing the live active icon to correspond to an in-line text font size may include retrieving and identifying the font size of the alphanumeric characters surrounding the live active icon placement in a data structure and manipulating the rendered display of the live active icon to be equivalent or similar to the size of the alphanumeric characters surrounding the live active icon placement location. Manipulating the rendered display of the live active icon may include altering the size, orientation, imagery, or any other characteristic of the live active icon such that the resulting size of the icon is equivalent or similar to the size of the alphanumeric characters surrounding the live active icon's placement. The sizing of the live active icon may be manually specified by the user, automated based on logical rules, or based on any other manner of defining a process that respond to a condition to produce an outcome. For example, a logical rule could be established to size a display of the live active icon to the maximum in-line text font size that is present in the document as a whole or the maximum in-line font text that is present in the line of text that the live active icon resides in. As a further example, the system may be configured to resolve conflicting sizing requirements in a single embedding. For example, if the font sizes surrounding the placement of the live active icon retrieved from the data structure are not equivalent, the system may size the display of the live active icon to be equivalent to the preceding font size, equivalent to the subsequent font size, an average of both font sizes, or size the live active icon based any other automation, logical rules, or any other defining process that respond to a condition to produce an outcome set by the user or determined by the system.

Some embodiments may include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Figure 6:
FIG. 6 illustrates an example of an electronic word processing document with embedded live active icons in-line with the text, consistent with some embodiments of the present disclosure.

As illustrated in FIG. 6, the electronic word processing document 610 may contain live active icons 612, 614, 616, 618, and 620, represented by alphanumeric text or graphical representations that are representative of a respective live application, embedded in-line with the text of the electronic word processing document. For ease of discussion, the live active icons present in the figure are representative of the live applications of information related to a flight status and gate information 612 and 620 and the weather 614, 616, and 618 for the corresponding days on the calendar, but it is to be understood that the live active icons can be representative of any data that is selected to be included in the live applications. As illustrated, the weather-based live active icon 614 may correspond to a weather-based, live application and may be depicted with a graphical representation of a sun to represent corresponding information in the live application; the forecasted weather of a sunny day in Los Angeles, Calif. on Mar. 3, 2022. Similarly, as illustrated, the weather-based live active icon 616 may be depicted as a graphical representation of a cloud with rain to represent the corresponding information in the weather-based live application that the weather is forecasted to be a rainy day in Vail, Colo. on Mar. 7, 2022. As illustrated, the weather-based live active icon 618 may be depicted with graphical representation of a cloud with rain and a lightning bolt to represent the corresponding information in the weather-based live application that is the forecasted weather of thunderstorms in Vail, Colo. on Mar. 8, 2022. These weather-based active icons may be live in that as the underlying information changes, so too does the graphical representation. For example, weather-based icon 616 may be rendered with a cloud and rain drops because the live application retrieves forecast information outside the electronic word processing document that rain is expected on March 7 in Vail, Colo. However, once the forecast information is updated and the application changes its forecast to sunny on March 7 in Vail, Colo., the weather-based icon 616 may be re-rendered with a graphical indication of a sun to reflect the underlying forecast information that has been changed. The underlying data from the live application represented by the live active icons may be determined manually by the user, via a mouse by clicking or hovering on certain data or by any other sensory form (visual, auditory, or tactile) of input, or the data may be determined by the system using logical rules, automation, machine learning, or artificial intelligence. For example, as disclosed above, a user could use the interface 510 to identify the live application. While not disclosed in FIG. 5, a user may also access the live application and elect certain data from the live application to be represented by the corresponding live active icon. For example, as seen in FIG. 6, the data represented by the live active icon 614 may be selected by a user accessing the weather tracker live application and selecting the particular data of the expected weather in Los Angeles, Calif. on Mar. 3, 2022 to be represented by the live active icon. As a further example, once the live application is elected, the system may perform contextual detection on the position of the live active icon in electronic word processing document to determine the relevant data from the live application to be represented in the live active icon. For example, in FIG. 6, once a user selects the live application to be a weather tracker application and selects the position of the live active icon 614 to be placed in the entry for March $3^{rd}$, the system may perform contextual detection to analyze the surrounding data in the March $3^{rd}$ location to determine that the live active icon (and the associated live application) is being applied to represent the particular data from the weather in Los Angeles, Calif. at 7:00 PM. Once the data from the live application represented by the live active icons is selected, the data may be recorded and stored in a data structure, stored in the metadata of the live active icon, or stored by another other method that allows for the data from the live application to be recorded.

By way of example, FIG. 5 depicts an interface 510 that may allow a user to choose an icon 516 to represent the live application 512 that may be selected for embedding. As represented by the icon selection area 518 in FIG. 5, the interface 510 may allow for an icon 516 to be chosen from a dropdown menu or manually uploaded by the user. FIG. 5 shows an exemplary depiction for these options for selecting an icon, but it is to be understood that the live active icons can be selected in any way that allows for a character to be representative of the live application selected to be embedded.

Some disclosed embodiments may include presenting, in a first viewing mode, the live active icon wherein during the first viewing mode, the live active icon is displayed embedded in-line with the text, and the live active icon dynamically changes based on occurrences outside the electronic word processing document. Presenting, in a first viewing mode, the live active icon, as used herein, may include rendering a display of the live active icon in a first format, such as in the format of an indicator (e.g., graphical, alphanumeric, or a combination thereof) that is representative of the selected data in the live active icon's corresponding live application. Displaying the live active icon embedded in-line with the text may include rendering a presentation of the live active icon in between alphanumeric characters. Dynamically changing, as used herein, may include re-rendering or replacing the icon, changing the icon's color, shape, size, background, orientation, the icon itself, or any other edit or modification in a continuous or periodic basis based on retrieved updates, such as an occurrence outside an electronic word processing document. The live active icons may dynamically change as manually specified by the user, automatically based on logical rules, or based on any other manner of defining a process that respond to a condition to produce an outcome. An occurrence outside the electronic word processing document may include any event that meets a defined threshold according to a condition. For example, an occurrence outside the electronic word processing document may include a flight status changing from "On-time" to "Delayed" because this may meet a defined threshold of any status change. As a result of this flight status change, a system may retrieve this update in a live application across a network, which may cause the display of an associated live active icon to change to reflect the flight status change. Automated dynamic changing may include evaluating if an occurrence has occurred in a live application outside of the electronic word processing document and upon that evaluation, retrieving a display alteration (e.g., a first viewing mode) to apply to the icon from a data structure. A data structure consistent with the present disclosure may include any collection of data values and relationships among them. The data structure may be maintained on one or more of a server, in local memory, or any other repository suitable for storing any of the data that may be associated with a plurality of rules and any other data objects. For example, a live active icon may dynamically change based on the system's evaluation of an occurrence internal or external to the live application, which may then be used to lookup a corresponding icon manipulation in a data structure. Evaluating occurrences outside of the electronic word processing document may include using an application programming interface, scraping text from a data source and comparing that data to the data, for the corresponding live active icon, stored in a data structure and calculating if a change in value has occurred, or any other method of interacting with data outside of the electronic word processing document to analyze the data present at that time. Evaluating occurrences outside of the electronic word processing document may also include establishing triggers for evaluating the data source, such as user defined events, a user defined frequency of evaluation, or any other manner of defining a trigger including user definitions, automation, logical rules, or machine learning.

Figure 7A:
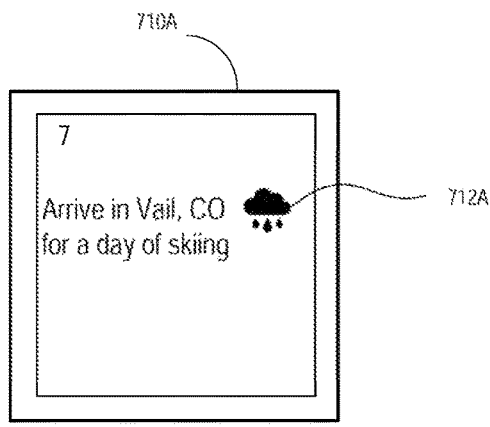
FIG. 7A illustrates an example of a live active icon in a first viewing mode, consistent with some embodiments of the present disclosure.
Figure 7B:
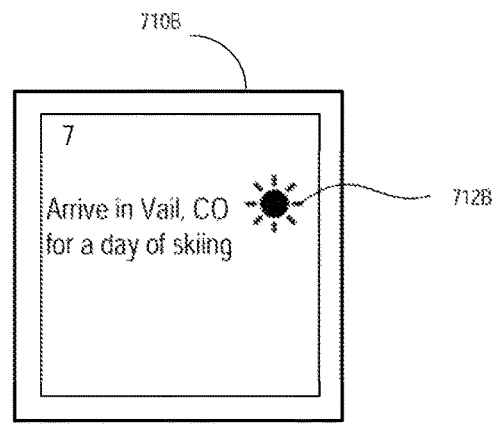
FIG. 7B illustrates an example of a live active icon that has dynamically changed based on occurrences outside the electronic word processing document, consistent with some embodiments of the present disclosure.

FIG. 6, FIG. 7A, FIG. 7B, FIG. 8A, FIG. 8B, and FIG. 9A depict exemplary live active icons in a first viewing mode in-line with the text in the electronic word processing document. As illustrated in FIG. 7A, and FIG. 7B, a live active icon 712A depicting the live application's forecasted weather in Vail, Colo. on Mar. 7, 2022 can dynamically change from depicting a live active icon 712A depicting the live application's rainy forecast to a live active icon 712B depicting the live application's updated sunny forecast in response to the change in forecast of the live application. FIG. 7A and FIG. 7B depict a live active icon dynamically changing due to the occurrence of an updated weather forecast, but it should be understood that a live active icon as described herein can dynamically change based on any evaluation of data within or outside the electronic word processing document.

Displays of live active icons may also be chosen as a group, family, or any other organization of live active icons. For example, in selecting the live application of weather in Vail, Colo., as shown in FIG. 6, a user may select a family of weather based live active icons to represent the live application and its underlying data. In this example, the live active icon could dynamically change to any other live active icons within the family including clouds with rain, clouds with lightning, the sun, or any other icon depicting a weather phenomenon.

In some embodiments, an interface may be configured to enable selection of abridged information for presentation in a first viewing mode. Abridged information for presentation, as used herein, may include any reduction of information (e.g., less than all of the information) that may be displayed in a display format for viewing. Enabling selection of abridged information for presentation may include presenting all or some of the information contained in a live application, receiving an input to instruct the processor to select an amount of information less than the original presentation of all or some of the information, and displaying the selected amount of information as the abridged information. For example, a live application may act on underlying data regarding flight status with a particular airline retrieved from the particular airline's website. The system may be enabled to receive a selection of information in the live application to select only the flight status itself (e.g., on-time, delayed, canceled) and not the rest of the information in the live application such as the flight number, departure date, and any other information. As a result, the system may present the flight status in a graphical manner as the live active icon that may be embedded in an electronic document. Abridged information may also include data retrieved from the running of an automation, logical rules, machine learning, or artificial intelligence. For example, the abridged information to be presented in the first viewing mode could be based on contextual detection. The system may analyze the text surrounding the position of the live active icon, the data present in the live application, or any other data available to the system to determine which information from the live application to include in the first viewing mode for the live active icon. As another example, the system may use contextual detection to determine the type of information present in the live application (e.g., a flight tracking application or a weather tracking application) to lookup that type of data in a data structure to find the corresponding abridged information to select to include in the first viewing mode. Similar to the example above regarding using the flight status as the abridged information, instead of the system receiving a selection of the information to determine which information to use as the abridged information, the system may automatically detect that the flight status and gate information should be used as the abridged information based on semantic analysis of the particular airline's website providing the underlying information and data. Additionally, the determination of the abridged information to include in the first viewing mode could be performed using automation, logical rules, machine learning, or any other manner of analyzing a data source to determine the data is relevant to include in the first viewing mode.

By way of example, FIG. 6 depicts live active icons 612 and 620 in the first viewing mode containing abridged information of the flights that may be dynamically changed on the corresponding days of the itinerary in the electronic word processing document 610 including the flight status and departure gate. The abridged information present in the display of the live active icons 612 and 620 may be selected manually by the user or automatically by the system using contextual detection, automation, logical rules, machine learning, or any other manner of analyzing a data source (e.g., the airline's website) to determine the relevant data to include in the first viewing mode.

In some embodiments, a live active icon may include an animation that plays in-line with the text during the first viewing mode. An animation that plays, as used herein, may include any visual display of the live active icon in a manner that visually changes or otherwise re-renders to display different information. For example, an icon may visually change in color to show a change in temperature over time. In another example, the icon may be visually depicted to represent movement, such as a graphical representation of an airplane with a moving propeller prop (e.g., via a GIF, video clip, or any other sequence of visual representations). In another example, the live active icon may rotate between different modes of display such that the live active icon displays different amounts of information in each mode. For example, a live active icon may alternate between a graphical display of an airplane, which may then switch to a display of alphanumerics including flight status or other flight information. The method of manipulating the live active icon to show changes or edits may include a sequence and may include implementing a user defined manipulation or a manipulation based on logical rules or any other manner of defining an output for a corresponding input. For example, a user may elect to animate the selected live active icon to be embedded, to which the system would retrieve the corresponding animation for the selected live active icon from a data structure. Playing in-line with the text during the first viewing mode, as used herein, may include using animations that do not alter the position or placement of the live active icon with respect to the surrounding alphanumeric characters when the live active icon is displayed in the first viewing mode as discussed previously above.

Figure 8A:
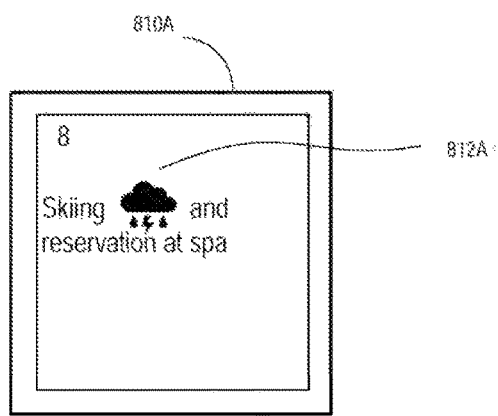
FIG. 8A illustrates an example of a live active icon in a first viewing mode, consistent with some embodiments of the present disclosure.
Figure 8B:
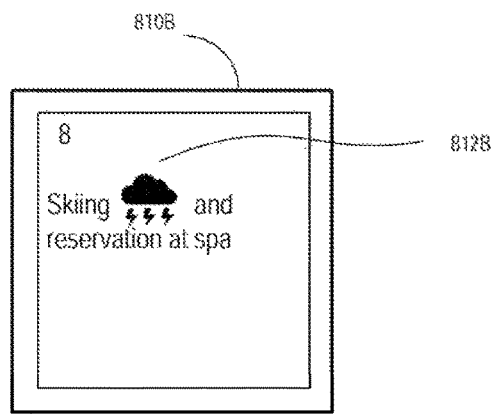
FIG. 8B illustrates an example of a live active icon with an animation that plays in-line with the text during the first viewing mode, consistent with some embodiments of the present disclosure.

By way of example, FIG. 5 depicts an interface 510 that allows a user to select indicator 520 to elect the live active icon to be animated. By way of example, in FIG. 8A a live active icon 812A is depicted representing the weather based live application's forecast for Vail, Colo. on Mar. 8, 2022 as having thunderstorms where the live active icon 812A is rendered with a cloud with rain and a single lightning bolts. The animation of that live active icon 812B is illustrated in FIG. 8B where the live active icon 812B is re-rendered as a cloud without rain but with three lightning bolts. The animation of the live active icon in FIG. 8A and FIG. 8B is shown in a two-step sequence, but it should be understood that an animation may manipulate a live active icon is any number of sequences and may manipulate the live active icon in any manner.

Some disclosed embodiments may include receiving a selection of a live active icon. Selecting the live active icon, as used herein, may include the use of a keyboard or a pointing device (e.g., a mouse or a trackball) by which the user can provide input (e.g., a click, gesture, cursor hover, or any other interaction) to an associated computing device to indicate an intent to elect a particular live active icon that may be displayed on an associated display of the computing device. Other kinds of devices can be used to provide for interaction with a user to facilitate the selection as well; for example, sensory interaction provided by the user can be any form of sensory interaction (e.g., visual interaction, auditory interaction, or tactile interaction).

By way of example, FIG. 9A shows the input of a selection of a live active icon 920A can be performed using a pointing device 922A.

Some disclosed embodiments may include, in response to a selection, presenting a second viewing mode, an expended view of a live application. Presenting a second viewing mode may include rendering a visual representation that may be rendered dynamically and correspond to information associated with a live application as well as using an auditory device, tactile device, or any other form of sensory feedback. The information included in the second viewing mode may include more, less, or the same data present in the first viewing mode (e.g., the rendering of the live active icon). An expanded view of the live application may include a display of additional information related to the live application or any other form of sensory feedback including additional information relative to the live application, which may be rendered on a larger area of a display than that of the first viewing mode. The information to be included in the second view as used herein may include live application data manually identified by the user or data identified based on logical rules, automation, machine learning, or any other manner of identifying relevant data to include in the expanded view. For example, the system may use contextual detection to determine the type of data present in the live application and use that classification to find the corresponding data to be presented in a second viewing mode based on a relationship stored in a data structure. In some embodiments, the at least one processor is configured to present the second viewing mode in an iframe. In some embodiments, the live active icon in a first viewing mode may have an appearance corresponding to imagery present in the expanded view. The appearance of a live active icon may include the rendered display of a live active icon to the user, the animation or sequence of a live active icon, the data or metadata of a live active icon, or any other sensory feedback associated with the live active icon. Imagery present in the expanded view may include images, alphanumerics, text, data, metadata, video, sound, or any other sensory feedback that is present within the display of information relative to the live application. An appearance corresponding to the imagery present in the expanded view may include dynamically changing the appearance of a live active icon to possess similar data, text, color, alphanumerics, images, or any other sensory feedback present in the expanded view. For example, the processor may detect the information present in an expanded view (e.g., full information from a live application) and look up a rule for a corresponding appearance stored in a data structure for the live active icon (e.g., abridged information). The corresponding appearance may correlate with the full information in an expanded view. For example, a live application in an expanded view may include a visual display of multiple depictions of racecars racing around a track. In a corresponding live active icon (e.g., the first viewing mode), the live active icon may contain a visual rendering of a single racecar (similar imagery) or a checkered flag (different but related imagery) to correspond to the imagery in the expanded view. Further, the system may use contextual analysis based on the classification of a live application (e.g., determining a live application possesses information related to an airplane flight) to determine which data present in the expanded view to include in the live active icon (e.g., the flight's status and gate information). Additionally, the appearance of a live active icon may change form from an image to text, text to animation, audible output to another form of sensory feedback, or from any first appearance to a second appearance. For example, a live active icon may initially be depicted as a sun to reflect imagery present in an expanded view consisting of a sunny weather forecast. If the system's connection with the live application were to be interrupted, the exemplary expanded view may consist of an "error" message, and as such, the live active icon may dynamically change from the sun to a text-based live active icon depicting "ERROR."

Figure 9B:
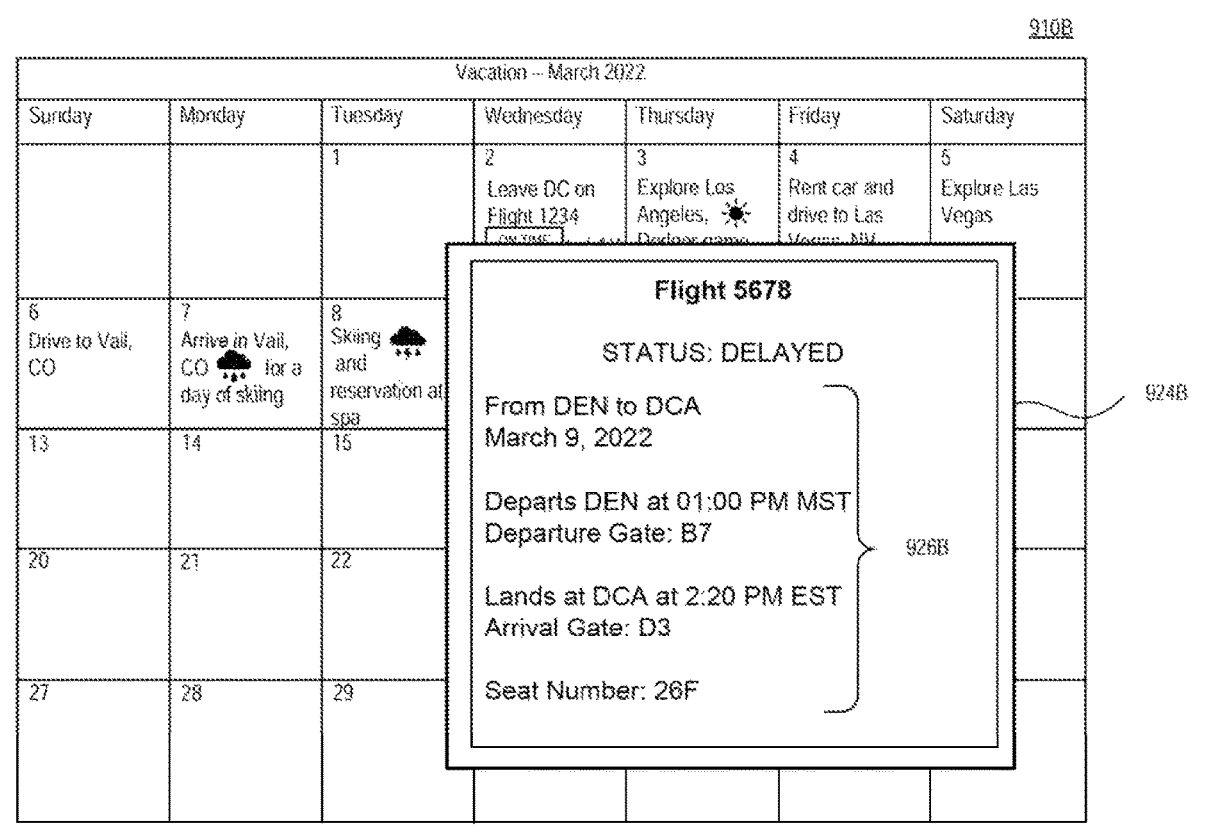

By way of example, in FIG. 9B, in response to the selection of active icon 920A with cursor 922A of FIG. 9A, a second viewing mode 924B may be presented that includes additional information 926B from the corresponding live application. In other embodiments, the system may have stored the underlying data to display additional information 9268 as all, or less than all but more than the information included in the live active icon, of the information that is normally presented in the live application (e.g., the second viewing mode 924B). As a result of embedding a live active icon (e.g., live active icon 920A of FIG. 9A) that is associated with the live application, the system may present abridged information from the live application for the live active icon 920A. For example, second viewing mode 924B presents all, or less than all but more than the information included in the live active icon, information including additional information 926B in FIG. 9B. Corresponding live active icon 920A of FIG. 9A may present abridged information to display only "DELAYED" and "Gate B7," which represent part of all of the available underlying information associated with the live application (as presented in the second viewing mode 924B of FIG. 9B).

Further, in FIG. 9A, the appearance of an exemplary live active icon 920A in its first viewing mode contains text corresponding to the displayed additional information 926B in the expanded view 924B of FIG. 9B. The text included in the appearance of the exemplary live active icon 920A of FIG. 9A may be set by the user, retrieved from a data structure, determined by rules, automation, machine learning, artificial intelligence, or any other method of analyzing data and formulating an output.

In some embodiments, an interface may include a permission tool for enabling selective access restriction to at least one of a live active icon or an expanded view. Enabling selective access restriction may include altering a presentation of at least a portion of information in an electronic word processing document, altering a user's interaction with a portion of information in the electronic word processing document, or any other method of restricting access to a portion of information in the electronic word processing document to prohibit or otherwise reduce a user's ability to view or edit a particular portion of information. An expanded view may include a presentation of information that is more substantive than the presentation of information in a live active icon, consistent with the discussion above regarding the second viewing mode for presenting information of the live application. For example, enabling selective access restriction may include enabling selectable portions of the live active icons or their expanded views in the electronic word processing document to be altered visually (e.g., redacted, blurred, or another other visual manipulation) or changing the settings of the electronic word processing document such that only authorized users can interact with the selected portions or the entirety of the information displayed in either the live active icon or in the expanded view. A permission tool as used herein may include graphical user interface elements or any other manner enabling the support of the management of the input, display, and access of users attempting to interact with or access information associated with a live active icon or the expanded view (e.g., the live application).

By way of example, FIG. 5 depicts an interface 510 allowing a user to control access, via permission indicator 522, by entering control settings into permission menu indicator 524 which can allow the user to select from a dropdown menu or manually enter names of parties that are allowed to access the live application or extended view. However, it should be understood that the manner of enabling the support of the management of the input, display, and access of users attempting to interact with a live active icon or the expanded view should not be limited to these examples.

Some disclosed embodiments may include receiving a collapse instruction. A collapse instruction, as used herein, may include a command signal indicating an intent to reduce or obscure the presentation of information. Receiving a collapse instruction may include receiving the command signal by the use of a keyboard or a pointing device (e.g., a mouse or a trackball) by which the user can provide input to a computing device, or through the lack of an instruction to default to the collapse instruction (e.g., a time out threshold is reached for inactivity). Other kinds of devices may include providing for a collapse instruction as well; for example, a sensory instruction provided by the user (e.g., visual instruction, auditory instruction, or tactile instruction). Further, the collapse instruction may be transmitted based on a corresponding rule, retrieved from a data structure, dependent on the data present in the second viewing mode or based on a permission tool parameter (e.g., allowing the user, as a part of the permission tool, to set a maximum duration that other users may view the second viewing mode). Some disclosed embodiments may include, in response to the collapse instruction, reverting from the second viewing mode to the first viewing mode. Reverting from the second viewing mode to the first viewing mode, as used herein, may include closing or otherwise obscuring the second viewing mode or any other manner of transitioning from the seconding viewing mode to the first viewing mode.

By way of example, as illustrated in FIG. 9A and FIG. 9B, reverting from the second viewing mode 924B of FIG. 9B would result in the live active icon returning to its first viewing mode 920A as shown by FIG. 9A. This may be a result of a user, through an associated computing device, sending an instruction to the system to revert to the first viewing mode via a collapse instruction. This collapse instruction may be received when the user's cursor 922A selects an activatable element that sends the collapse instruction to the system, or when the user's cursor 922A stops moving in the display over a period of time (that may be a default or defined), in which the system may also default to interpreting this as a collapse instruction. The collapse instruction may also be received when the user's cursor 922A selects a different live active icon or when the user's cursor 922A selects any part of the electronic word processing document external to the second viewing mode 924B.

Figure 10:
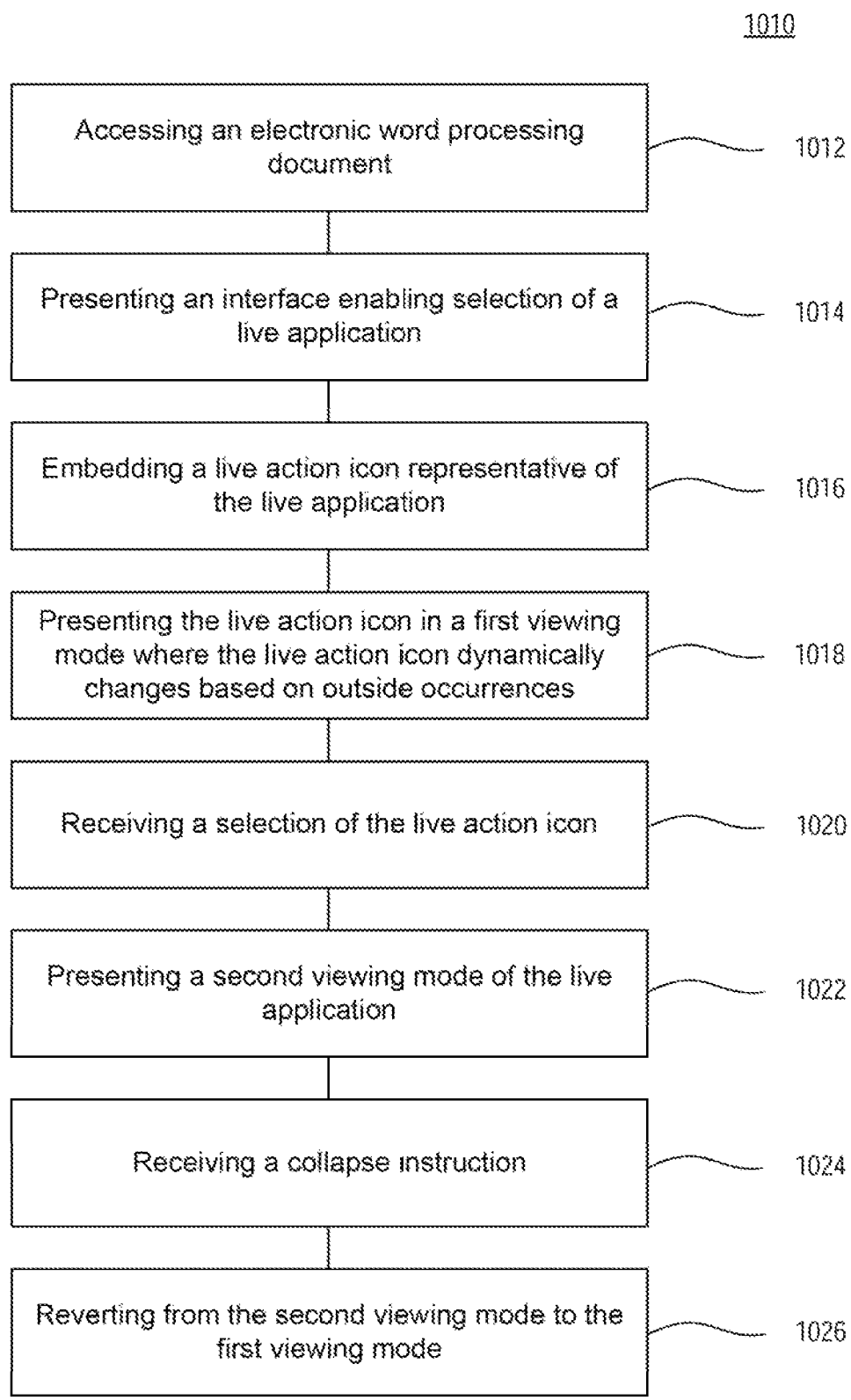
FIG. 10 illustrates a block diagram of an example process for causing dynamic activity in an electronic word processing document, consistent with some embodiments of the present disclosure.

FIG. 10 illustrates a block diagram of an example process 1010 for causing dynamic activity in an electronic word processing document. While the block diagram may be described below in connection with certain implementation embodiments presented in other figures, those implementations are provided for illustrative purposes only, and are not intended to serve as a limitation on the block diagram. In some embodiments, the process 1010 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 4 to 9B by way of example. In some embodiments, some aspects of the process 1010 may be implemented as software (e.g., program codes or instructions) that are stored in a memory (e.g., the memory portion 122 in FIG. 1) or a non-transitory computer-readable medium. In some embodiments, some aspects of the process 1010 may be implemented as hardware (e.g., a specific-purpose circuit). In some embodiments, the process 1010 may be implemented as a combination of software and hardware.

FIG. 10 includes process blocks 1012 to 1026. At block 1012, a processing means (e.g., any type of processor described herein or that otherwise performs actions on data) may access an electronic word processing document, consistent with some embodiments of the present disclosure.

At block 1014, the processing means may present an interface enabling selection of a live application. The live application may be outside the electronic word processing document and the selection may be made for embedding the live application in the electronic word processing document, as previously discussed in the disclosure above.

At block 1016, the processing means may embed a live active icon representative of the live application. The live active icon may be embedded in-line with text of the electronic word processing document, consistent with the discussion above.

At block 1018, the processing means may present the live active icon in a first viewing mode where the live active icon dynamically changes based on outside occurrences. The live active icon in the first viewing mode may be embedded in-line with text of the electronic word processing document, consistent with the discussion above.

At block 1020, the processing means may receive a selection of the live active icon, as previously discussed in the disclosure above.

At block 1022, the processing means may present a second viewing mode of the live application. The second viewing mode may be an expended view of the live application, consistent with the discussion above.

At block 1024, the processing means may receive a collapse instruction, as previously discussed in the disclosure above.

At block 1026, the processing means may revert from the second viewing mode to the first viewing mode, as previously discussed in the disclosure above.

This disclosure presents various mechanisms for dynamic work systems. Such systems may involve operations that enable electronic word processing documents to include dynamic activity. By way of one example, operations may enable various dynamic elements from an external file to be reflected in an electronic word processing document. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

In electronic word processing documents, it may be beneficial to employ a myriad of actions for triggering edits to the document when one or more conditions are met. Ensuring that the information in an electronic word processing document is up-to-date when that information is related to dynamically changing files external to the electronic word processing document can be daunting when the possible changes to the applications could be endless. Therefore, there may be a need for unconventional innovations for ensuring that data in an electronic word processing document is up-to-date and correct through efficient processing and storing methods.

Some disclosed embodiments may involve systems, methods, and computer-readable media for automatically updating an electronic word processing document based on a change in a linked file and vice versa. The systems and methods described herein may be implemented with the aid of at least one processor or non-transitory computer readable medium, such as a CPU, FPGA, ASIC, or any other processing structure(s) or storage medium, as described herein. Electronic word processing documents (and other variations of the term) as used herein are not limited to only digital files for word processing, but may include any other processing document such as presentation slides, tables, databases, graphics, sound files, video files or any other digital document or file. Electronic word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration. An electronic word processing document may be stored in one or more repositories connected to a network accessible by one or more users through their computing devices.

Automatically updating an electronic word processing document may include carrying out instructions to sync, change, manipulate, or any other form of altering information associated with an electronic word processing document. Such automatic updating may occur in response to a change in a linked file, or vice versa (e.g., causing an automatic update to the linked file in response to a change in the electronic word processing document), or any other trigger or threshold being met. It should be understood that all embodiments and disclosures discussed and disclosed herein do not have to operate in a certain order (e.g., variable data element to corresponding data in the external file, data in external file to corresponding variable data element). As such, all changes, updates, edits, or other manipulations should be understood to occur in any manner, sequence, direction, and do not possess a structured order. Updating may be initiated by the user or by the system based on a trigger or threshold being met. A linked file may include any electronic document that may be associated with or otherwise have an established relationship with the electronic word processing document. A linked file may also include another electronic word processing document, files or data external to the electronic word processing software or application, or any other type of file or set of data (e.g., presentations, audio files, video files, tables, data sets). A change in a linked file may include any update, alteration, manipulation, or any other form of variation to the data present in a linked file in its entirety or to a portion, region, block, or section of the data present in a linked file including metadata. Detecting a change in a linked file may involve receiving an API call (or other type of software call) regarding a change to the entirety or a portion, region, block, or section of a linked file. Detecting a change in a linked file may also include the system storing the data present in a linked file in a data structure and periodically accessing the linked file to evaluate if the data present in the linked file has changed, such as scraping HTML text of the file, when compared to the data from the linked file stored in the data structure. The periodic evaluation of the data present in the linked file may be established by a user at any time interval (e.g., every millisecond, second, minute, hour, day, or any other increment) or may be set established by the system using an automation, logical rules, machine learning, artificial intelligence, or any other manner of establishing a time interval based or event dependent based evaluation of data present in a linked file.

By way of example, FIG. 11 illustrates an electronic word processing document 1110, consistent with some embodiments of the present disclosure. As shown in the figure, an electronic word processing document 1110 can include information regarding a schedule created by a user of the electronic word processing document 1110. For ease of discussion, the electronic word processing document 1110 presented in the figure may be representative of displaying a new hire orientation schedule created by the user that is to be distributed to the listed speakers and new hires, but, as explained above, it is to be understood that the electronic word processing document can be any digital file.

Some embodiments may include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Some disclosed embodiments may include accessing an electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

For example, as shown in FIG. 2, a user device 220-1 may send a request to access the electronic word processing document to the network 210. The request can then be communicated to the repository 230-1 where the document is stored via the database management system 235-1. The electronic word processing document can be retrieved from the repository 230-1 and transferred through the database management service 235-1 and network 210 for display on the user device 220-1.

Some disclosed embodiments may include identifying in an electronic word processing document a variable data element, wherein the variable data element may include current data presented in the electronic word processing document and a link to a file external to the electronic word processing document. A variable data element may include any text, image, alphanumeric, video file, audio file, or any other information present in an electronic word processing document that may be subject to automatic updates such that the information in the variable data element may be considered to be dynamic information. Identifying a variable data element in an electronic word processing document may include analyzing the information present in the electronic word processing document to automatically detect if any information possesses a link to an external file. Identifying a variable data element in an electronic word processing document may also include the system accessing a data structure to identify the current data presented in the electronic word processing document that is stored in the data structure to correspond to a variable data element with its corresponding link(s) to external file(s). In additional embodiments, identifying a variable data element may include a manual selection of static information in an electronic document to designate that the selection is a variable data element that may be reconfigured to include dynamic information (e.g., by linking the selected information to an external file). Current data presented in the electronic word processing document, as used herein, may include any information (e.g., image, text, alphanumeric, video file, audio file, or any other data) present in the electronic word processing document that may correspond to a variable data element. A variable data element may include a link to a file external to the electronic word processing document. A link to a file external to the electronic word processing document may include a functioning hyperlink that may be activated or triggered to access and retrieve data in a separate electronic document from the electronic word processing document within the system or external to the system. Activating the link may cause the processor to retrieve information in an external file from a storage medium, such as a local storage medium or a remote storage medium. For example, the link may include a text hyperlink, image hyperlink, bookmark hyperlink, or any other type of link that may allow the system to retrieve the external file from a separate storage device or a third party platform independent from the electronic word processing document. A file external to the electronic word processing document may include a file hosted by a third party platform independent from the electronic word processing document, a file separate from the electronic word processing document, or any other collection of data outside of the electronic word processing document (e.g., audio files, video files, data files, etc.). In some embodiments, an external file may include an additional electronic word processing document. In some embodiments, the current data may include text of the electronic word processing document and the link may include metadata associated with the text. As discussed above, the variable data element may include current data presented in the electronic word processing document and a link to a file external to the electronic word processing document. The variable data element may include current data in the form of text (e.g., the text "DEAL PENDING") that may be configured to be dynamic. The link may include metadata associated with the text in a manner that reflects the semantic meaning of the text in the current data. For example, when the variable data element includes the text "DEAL PENDING" in a first electronic document, the link between the variable data element to the external file (e.g., a second electronic document) may be an activatable hyperlink with tagged information indicative of the status of the variable data element as pending or incomplete. In this way, the tagged information in the form of metadata may be retrieved and presented on a display, or may be transmitted across a network to the external file (e.g., the second electronic document) so that the status of the variable data element in the first electronic document may be transmitted without the need for an additional accessing or retrieving of information step of data in the first electronic document to decrease processing times and decrease memory usage.

By way of example, FIG. 12 illustrates a file 1210 external to an electronic word processing document 1110 of FIG. 11, consistent with some embodiments of the present disclosure. As shown in FIG. 12, the file 1210 external to an electronic word processing document 1110 may be another electronic word processing document and can include information regarding a schedule created by a user. For ease of discussion, the file 1210, external to the electronic word processing document 1110, as illustrated in FIG. 11, presented in the figure may be representative of displaying a new hire orientation schedule created by the user, but, as explained above, it is to be understood that the file external to an electronic word processing document can be any collection of data outside of the electronic word processing document. For ease of discussion, in the particular example depicted by FIG. 12, the external file 1210 is a new hire orientation schedule prepared by the Human Resources department of a company that is organizing the new hire orientation. As such, for this discussion, only employees in the Human Resources department may have access to the planning document. As discussed in more detail below, a variable data element may be designated from current data in an electronic document such as electronic document 1410 of FIG. 14. The current data in the electronic document may be in the form of textual information such as variable data elements 1412, 1414, and 1416.

In some embodiments, the at least one processor may be further configured to present an interface in an electronic word processing document for enabling designation of document text as a variable data element and for enabling designation of a file as a source of replacement data. Presenting an interface in the electronic word processing document may include rendering a display of information with activatable elements that may enable interaction with the information through a computing device. It should be understood that the rendering of this display may occur within the electronic word processing document, outside of the word processing document, in an iframe, or in any other manner of rendering the display to the user. An interface enabling designation of a variable data element may include any rendered display of information that may include options corresponding to different data present in the electronic word processing document with the same or different functionality such that any of the data present in the electronic word processing document may be selected through an interaction from a computing device associated with a user (e.g., through an activatable element such as a graphical button). Designation of a variable data element may include the use of an interface allowing the user to manually identify, via interaction with a computing device associated with the user, textual input, or any other sensory form (visual, auditory, or tactile) of input, data or sets of data, including document text (e.g., alphanumerics, graphics, or a combination thereof), present in the electronic word processing document to be a variable data element. Designation of a variable data element may also include the processor implementing logical rules, automations, machine learning, or artificial intelligence (e.g., semantic analysis) to determine and designate information in an electronic document as a variable data element. For example, an interface may allow a user to designate document text present in an electronic word processing document as a variable data element by using an interface allowing the user to select the document text through an interaction from a computing device (e.g., a mouse, keyboard, touchscreen, or any other device) associated with a user. An interface enabling designation of a file as a source of the replacement data may include any rendered display of information that may include options corresponding to different files with the same or different functionality such that any of the files may be selected through an interaction from a computing device associated with a user (e.g., through an activatable element such as a graphical button). Designation of a file as a source of the replacement data may include allowing the user to manually identify and assign, via textual or any other sensory form (visual, auditory, or tactile) of input, an external file using an interface that allows the user to upload the identification information of the file (e.g., a web address, a file location, or any other address or file path). The user may also designate a file as a source of replacement data by manually entering, via textual or any other sensory form (visual, auditory, or tactile) of input, the identification information of the file in-line with the text or other data contained in the electronic word processing document. A source of replacement data, as used herein, may include any electronic file containing data or information (e.g., text, images, data, alphanumerics, video files, audio files, or any other data in the external file) that the user or system selects to correspond to or is otherwise linked or associated with the current data (e.g., document text) in the electronic word processing document represented by a variable data element such that if there is a change in the source replacement data in the external file, the current data of the corresponding variable data element in the electronic word processing document will change to match or reflect a change in the replacement data. For example, the user may utilize an interface to select document text present in the electronic word processing document to be designated as current data for a variable data element and use the interface to manually enter the file location of the external file and identify the replacement data in that file corresponding to the selected variable data element. As another example, the system may allow the user to identify the relevant file(s) and replacement data and store the data, and replacement data, of the relevant file(s) in a data structure. The system may then perform contextual analysis, or any form of automation, machine learning, semantic analysis, or artificial intelligence, on the current data present in the electronic word processing document to suggest, recommend, or identify data present in the electronic word processing document to be designated as current data for a variable data element linked to one or more of the replacement data in the relevant files identified by the user. The system may store the variable data element, the link(s) to the corresponding external file(s), and the replacement data in those files in a data structure.

Figure 13:
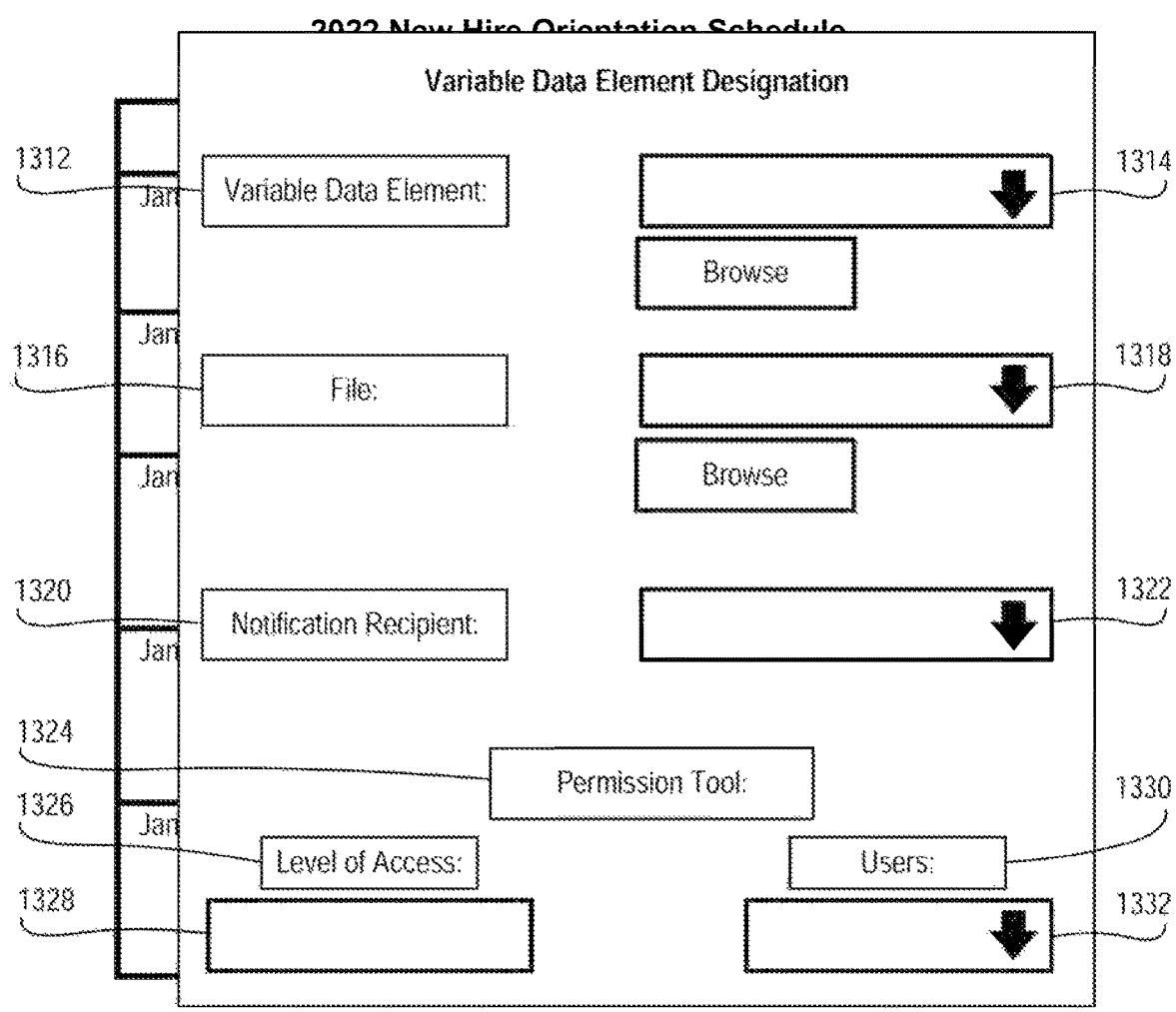
FIG. 13 illustrates an example of an interface enabling designation of document text as a variable data element, designation of a file as a source of replacement data, and permissions to be set on a variable data element, consistent with some embodiments of the present disclosure.

FIG. 13 illustrates an exemplary interface 1310 enabling designation of current data in the electronic word processing document 1110 of FIG. 11 as a variable data element via activatable element indicator 1312, consistent with some embodiments of the present disclosure. In FIG. 13, a user may be enabled to interact with indicator 1312 to confirm a selection of current data or to change or add a selection of another set of current data to designate as a variable data element. This may involve selecting a location in the electronic document to select data, or may involve a manual interaction with the current data in the electronic document (e.g., highlighting textual information) to make the selection. In FIG. 13, interface 1310 may enable designation of current data as a variable data element 1312 by interacting with lookup interface 1314 that may enable a user to manually enter text to identify current data located in the electronic word processing document 1110 of FIG. 11 or enable a user to browse the electronic word processing document 1110 of FIG. 11 and manually interact with the document to select current data as a variable data element. While not shown in this figure, it should be understood that the lookup interface 1314 may also feature a drop-down menu that allows the user to view all or filter by types of data present in the electronic word processing document 1110 of FIG. 11 for designation as a variable data element. For example, a user may interact with the lookup interface 1314 to view a rendered menu of all image files (e.g., JPG, PNG, etc.), retrieved from a data structure storing all data present in the document, present in the electronic word processing document 1110 of FIG. 11 and select an image from the menu to designate as a variable data element. In FIG. 13, an exemplary interface may also enable designation of a file via activatable element indicator 1316 as a source of replacement data, consistent with some embodiments of the present disclosure. A user may interact with lookup interface 1318 that may enable a user to manually enter identification information of a file (e.g., web address, file location, etc.) or enable a user to upload an external file. While not shown in this figure, it should be understood that the lookup interface 1318 may feature a drop-down menu allowing the user to designate recent files, or any other classification of files, as the source of the replacement data. Further, while not shown in this figure, it should be understood that the interface 1310 may allow a user to access the identified external file to identify the replacement data in the external file (e.g., specific data, a specific cell, a region of a document, the document in its entirety, etc.).

FIG. 14 illustrates an exemplary electronic word processing document 1410 containing current data that has been designated as variable data elements 1412, 1414, and 1416, consistent with some embodiments of the present disclosure. For ease of discussion, the text that has been designated as variable data elements 1412, 1414, and 1416 is displayed in bold and italics. However, it should be understood that a variable data element can be displayed in any manner distinguishing the data of the variable data element or in any manner not distinguishing the variable data element data from other data. For example, a data that has been designated as a variable data element may be displayed with a small icon next to the data, may change color once designated, may change font style, may change size, or may be displayed with any other distinguishing feature or without distinguishing features.

Some disclosed embodiments may include accessing an external file identified in a link. Accessing an external file identified by a link may include retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), and/or any other suitable communication method that provides a medium for exchanging data. Accessing an external file may also involve constructing an API call, establishing a connection with a source of the external file (e.g., using an API or other application interface), authenticating a recipient of application data, transmitting an API call, receiving application data (e.g., dynamic data), and/or any other electronic operation that facilitates use of information associated with the external file. The link may be associated with a location of an external file in a repository such that the processor may access and retrieve the data associated with the external file quickly by activating and interpreting the information associated with the link.

Some disclosed embodiments may include pulling, from an external file, first replacement data corresponding to the current data. Pulling, from an external file, replacement data corresponding to the current data, as used herein, may include copying, duplicating, reproducing, extracting, or any other form of transferring the value of the data (e.g., information such as text) designated as the first replacement data in the external file corresponding to the current data in the electronic word processing document. For example, the system may access the external file and copy the image, text, audio file, video file, alphanumerics, or any other character or data that has been designated as the replacement data, as described throughout. The replacement data may then be retrieved from the external file for further processing or for transmission to the electronic word processing document so that the processor may re-render a display of the current data with the replacement data.

Some disclosed embodiments may include replacing current data in an electronic word processing document with first replacement data. Replacing current data in an electronic word processing document, as used herein, may include overriding, substituting, editing, making note of, re-rendering a display of information, or any other form of changing the current data in an electronic word processing document to reflect a change in the first replacement data. However, it should be understood that replacing current data in an electronic word processing document with a first replacement data does not require the current data, after replacing, to be identical to the replacement data. For example, if the settings of the source of the replacement data, an external file, allow the value of the replacement data to extend to five significant figures and the settings of the electronic word processing document only allowed data to extend to three significant figures, replacing the current data with the replacement data may result in the replaced current data and the replacement data to not be equivalent.

By way of example, FIG. 15A illustrates a file 1510A external to an electronic word processing document 1110 of FIG. 11 displaying an updated version of the external file 1210 in FIG. 12. The text 1512A represents an updated entry for the assigned speaker for the welcome speech scheduled on Jan. 2, 2022. For ease of discussion, similar to the external file 1210 in FIG. 12, this file 1510A may be internal to the Human Resources department of a company such that only employees of that department can access this document and serve as a source of replacement data. For example, electronic document 1410 has current data "Michelle Jones, CEO" 1412 in the form of text that has been designated as a variable data element. This variable data element 1412 may be linked to an external file serving as a source of replacement data as shown in FIG. 15A. FIG. 15A shows an example of a change that has been made to the speaker from Michelle Jones, CEO 1412 of FIG. 14 (e.g., the "current data") to Randall James, CTO 1512A (e.g., the "replacement data") of FIG. 15A. As a result of this change in the source of replacement data in the speaker on Jan. 2, 2022, the system may update the variable data element 1412 of FIG. 14 to reflect the updated speaker to be Randall James, CTO, reflected in updated variable data element 1512B of electronic document 1510B. FIG. 15B illustrates an electronic word processing document 1510B containing variable data elements 1512B, 1514B, and 1516B. FIG. 15B illustrates the replacing of the former document text of variable data element 1412 of FIG. 14, displayed as Michelle Jones, CEO, with the corresponding value of the variable data element's 1512B replacement data 1512A as depicted in FIG. 15A. The document text of variable data element 1512B of FIG. 15B, now matches the replacement data 1512A of FIG. 15A, displayed as Randall James, CTO.

Some embodiments may include identifying a change to a variable data element in an electronic word processing document. A change to a variable data element in the electronic word processing document may include any editing, manipulating, updating, altering (e.g., addition, subtraction, rearrangement, or a combination thereof), re-sizing a display, or any other form of variation to the variable data element. For example, editing the text of a text-based variable data element or changing the percentage represented in a pie chart of an image-based variable data element may constitute a change to the variable data element. Identifying a change to a variable data element may include the processor comparing the value of the data of the variable data element to the value to the prior current data stored in a data structure for the corresponding variable data element or use any other method of evaluating the value of the current data of a variable data element. The processor may initiate a comparison after detecting a user's interaction with the document resulting in an edit of the document, such as a user editing the text of a text-based variable data element, highlighting a portion of a variable data element and deleting it, or any other user interaction with the document resulting in an edit or manipulation of a variable data element. Further, the system may evaluate the value of data corresponding to a variable data element upon trigger events, such as when the document is opened, when the document is saved, after a certain amount of time has passed, or any other event that may trigger an evaluation of the data corresponding to the variable data element.

By way of example, FIG. 16A illustrates an electronic word processing document 1610A including variable data elements 1612A, 1614A, and 1616A, consistent with some embodiments of the present disclosure. As illustrated in FIG. 16A, variable data element 1614A (document text of Jan. 4, 2022) and variable data element 1616A (document text of Jan. 3, 2022) have changed from their former document text values of the variable data element 1514B with a document text of Jan. 3, 2022, and variable data element 1516B, with a document text of Jan. 4, 2022, as illustrated in FIG. 15B. For ease of discussion, the new values variable data elements 1614A and 1616A present in the electronic word processing document 1610A could have been performed manually by an entity with access to the electronic word processing document 1610A. For example, Sam Miller, Benefits Coordinator in this example, may have had a scheduling conflict on Jan. 4, 2022, and thus edited the schedule on an associated computing device to switch timeslots with Carl Howard such that Carl would present on January 4$^{th}$ and Sam could present on January 3$^{rd}$ in a source of replacement data. In response to these edits, the processor may receive the input as replacement data and transmit the information to the variable data elements and cause the display to re-render the variable data elements with the updated information input by Sam. Further to the example, but not present in the figure, when the system detects Sam interacting the document text of the variable data elements, the system may evaluate the data of the variable data elements Sam interacts with and compare the data to the corresponding variable data element stored in a data structure to determine if Sam edited the variable data elements as shown by variable data elements 1616A and 1614A.

In some embodiments, at least one processor may be configured to transmit a message to a designated entity when a variable data element is changed. A designated entity may include any assigned name, phone number, email address, employee identification number, or any other identifying information to deliver or transmit a message or notification to. Establishing a designated entity may be accomplished manually by the user via an interface allowing a user to manually enter entity information or may be accomplished automatically by the system via logical rules, automation, machine learning, or artificial intelligence. For example, a logical rule may be established such that if a change to a variable data element is identified, a message is sent to the author of the document, the entity that designated the data as a variable data element, or any other entity involved or interested in the document. Transmitting a message to a designated entity when a variable data element is changed may include sending a message via email, SMS, MMS, push-notifications, phone call, or any other manner of communicating information relating the change that occurred in the variable data element. For example, if text representing the name of the presenter for a presentation was designated to be a variable data element and the name of presenter was changed, the user may have designated the entities to receive a message to be employees with the names matching that of the previously listed presenter and the newly listed presenter. In another example, the system may use logical rules to determine the designated entities. Further to this example, if text representing a time frame for a series of presentations is changed, a logical rule may designate the entities to receive a message to be all listed presenters or only the presenters whose time slots were changed. In addition to this example, the user or system may establish a threshold of change that must be met to transmit a message to a designated entity. For example, if text representing a stock price was designated to be a variable data element, a user may only be interested if the stock price changed to be above or below a certain threshold, as such the user may establish a threshold such that a message only be transmitted if the lower or upper threshold is crossed. The message may be transmitted in response to an established threshold is met, such as when the displayed information or any data associated with the variable data element (e.g., metadata) is updated.

FIG. 13 illustrates an exemplary interface 1310 allowing the user to designate an entity, via activatable element indicator 1320, to receive a message if any edits are made to the variable data element 1312, consistent with some embodiments of the present disclosure. In FIG. 13, interface 1310 may enable designation of entities to be notified of a change in a variable data element 1312 by interacting with lookup interface 1322 that may enable a user to manually choose a designated entity from a drop-down list such as an employee list or manually enter contact information such as a phone number or email address. While not pictured in the figure, upon the detection of a change to a variable data element, the system may enact logical rules, automation, machine learning, or artificial intelligence to determine an interested party in relation to the change. It should be understood that while the interface 1310 illustrated at FIG. 13 includes the ability to designate entities to be notified upon identification of a change to a variable data element in the same interface 1310 allowing designation of data as a variable data element, these designations do not have to be included in the same rendered interface. It is understood that the transmission of a message and designation of an entity to receive the message may be done in any manner as discussed herein or any manner allowing an entity to be designated to receive a message.

In some embodiments, at least one processor may be configured to display an interface for enabling permissions to be set on a variable data element and to thereby restrict modifications thereto. Displaying an interface for enabling permissions to be set on a variable data element may include rendering a display of information with activatable elements that may enable interaction with the information through a computing device. Permissions to be set on a variable data element may include a parameter that may control the ability of a user, user account, device, system, or combination thereof to access a variable data element, view a variable data element, use a function associated with a variable data element, edit a variable data element, delete a variable data element, move a variable data element, re-size a variable data element, influence a variable data element, or perform any other operation relative to a variable data element. Enabling permissions to be set on a variable data element and to thereby restrict modifications thereto may include controlling the ability of a user, user account, device, system, or combination thereof to prevent alterations, changes, edits, or any other modification or limitation to the data corresponding to a variable data element. This may involve sending instructions to the processor to place a memory lock on the data stored in the repository associated with the variable data element until an entity accessing the data associated with the variable data element is determined by the processor to be an authorized editor. Restricting modifications may include reducing the ability to alter (e.g., may alter a color, but not the text) or completely prohibiting any alterations to a variable data element. Permission settings for a particular variable data element in a document may be independent from the permission settings for other variable data elements located in the same document. For example, a first variable data element may have restrictive permission settings that enable only the author of the document to edit the first variable data element while a second variable data element may have public permission settings that enable any user to edit the second variable data element. As a result, an author of the document may edit both the first variable data element and the second variable data element while a second user (e.g., not an author of the document) would be prevented from making any edits or alterations to the first variable data element and would only be able to do so for the second variable data element.

FIG. 13 illustrates an exemplary interface 1310 allowing the user to enable permissions to be set on a variable data element and to thereby restrict modifications thereto, consistent with some embodiments of the present disclosure. In FIG. 13, interface 1310 may enable designation different levels of access via activatable element indicator 1326 and lookup interface 1328. Lookup interface 1328 may allow the user to access a drop down menu containing different levels of permission (e.g., "view only" or "redact data"). Further, interface 1310 may enable the user to designate the users to which the various level of access may apply via activatable element indicator 1330. Lookup interface 1332 may allow the user to manually enter a user's name to correspond to the level of access identified via indicator 1226. Lookup interface 1332 may also enable the user to designate the users to which the level of access applies by allowing the user to select the users from a list, such as an employee list. However, it is understood that the display of an interface for enabling permissions to be set on a variable data element may be displayed in any manner as discussed herein or any manner allowing the user to enable permissions.

Some embodiments may include, upon identification of a change, accessing an external file via a link. Accessing an external file via a link may include retrieving the electronic word processing document from a storage medium, such as a local storage medium or a remote storage medium, following activation of a text hyperlink, image hyperlink, bookmark hyperlink, or any other type of link allowing the system to identify a repository and retrieve the file from a separate storage device or a third party platform independent from the electronic word processing document. In some embodiments, accessing the external file via a link may include retrieving the file from a web browser cache. Additionally or alternatively, accessing the external file may include accessing a live data stream of the external file from a remote source. In some embodiments, accessing the external file may include logging into an account having a permission to access the document. For example, accessing the external file may be achieved by interacting with an indication associated with the external file, such as an icon or file name, which may cause the system to retrieve (e.g., from a storage medium) a particular external file associated with the indication.

Some embodiments may include updating an external file to reflect a change to a variable data element in the electronic word processing document. Updating an external file to reflect a change to a variable data element may include syncing, changing, modifying, editing, manipulating, or any other form of altering data associated with the variable data element in the external file in response to a change to a variable data element. The external file reflecting a change to a variable data element may include updating the data in the external file corresponding to the data or information associated with the variable data element in the electronic word processing document to be equivalent to the change to the variable data element, to be similar to the change to the variable data element, to manipulate the data by a similar magnitude or process as the variable data element, or any other edit to reflect the change to the variable data element. For example, the variable data element present in an electronic word processing document may be text-based data identifying the amount of money a company has raised at a fundraiser and is linked to an external accounting file. If on the final day of the fundraiser, the president of the non-profit receives a donation in person that puts the amount of donations collected over the company's goal, the president may edit the variable data element to reflect the new total and change the font color to green. Following this example, the data of the external accounting file corresponding to the variable data element in the electronic word processing document may be updated to reflect the change (e.g., adding "Goal Reached" to the external file) and thus, represent the new total in a green font or otherwise reflecting an indication of the information reflected in the variable data element.

By way of example, FIG. 16B illustrates an exemplary external file 1610B including text-based data 1612B, 1614B, and 1616B corresponding to variable data elements 1612A, 1614A, and 1616A in an electronic word processing document 1610A of FIG. 16A, consistent with some embodiments of the present disclosure. As shown in FIG. 16B, the external file 1610B has been updated to reflect the changes to variable data elements 1614A and 1616A in FIG. 16A such that the data corresponding to variable data element 1614A has changed from Jan. 3, 2022 to Jan. 4, 2022 and the data corresponding to variable data element 1616A has changed from Jan. 4, 2022 to Jan. 3, 2022.

In some embodiments, at least one processor may be configured to receive a selection of a variable data element and to present, in an iframe, information from an external file. Receiving a selection of a variable data element, as used herein, may include the use of a keyboard or a pointing device (e.g., a mouse or a trackball) by which the user can provide input (e.g., a click, gesture, cursor hover, or any other interaction) to an associated computing device to indicate an intent to elect a particular variable data element that may be displayed on an associated display of the computing device. Other kinds of devices can be used to provide for interaction with a user to facilitate the selection as well; for example, sensory interaction provided by the user can be any form of sensory interaction (e.g., visual interaction, auditory interaction, or tactile interaction).

By way of example, FIG. 17A shows the input of a selection of a variable data element 1712A in an electronic word processing document 1710A which can be carried out using a cursor 1718A associated with a device (e.g., touchpad, touchscreen, mouse, or any other interface device), consistent with some embodiments of the present disclosure.

Presenting, in an iframe, information from an external file may include rendering display of an iframe or a similar window including any data present or otherwise stored in an external file. The information from the external file included in the iframe may include the entirety of the external file, the replacement data in the external file, or any other data present in the external file and selected by the user or system to be included in the iframe. For example, the system may use logical rules, automation, machine learning, or artificial intelligence to determine the information from the external file to include in the iframe based on contextual analysis of the data corresponding to the variable data element. As an additional example, the information in the iframe may include the past values of the replacement data, retrieved from a data structure that stores the value of the replacement data each time the system receives an API call (other type of software call) that the replacement data has changed or the system detects a change in the replacement data, to show to change over time in the value of the replacement data in the external file. For example, a user may select a variable data element corresponding to the inventory for a particular product via a mouse click and, in response, the system may render a display of an iframe including information related to the inventory of a particular item, retrieved from the external file, such as the price of the item, the next estimated restock date, and the history of sales for that item.

By way of example, in FIG. 17B, in response to the selection of variable data element 1712A with cursor 1718A in FIG. 17A, an iframe 1712B may be presented to display data from the external file 1714B and its associated information (e.g., textual, graphical, or a combination thereof), consistent with some embodiments of the present disclosure. For example, the information 1714B from the external file may include additional information not typically displayed in the electronic word processing document 1710B such as the text-based data representing Randall James' talking points 1716B or metadata that is stored in the electronic word processing document 1710B.

Figure 18:
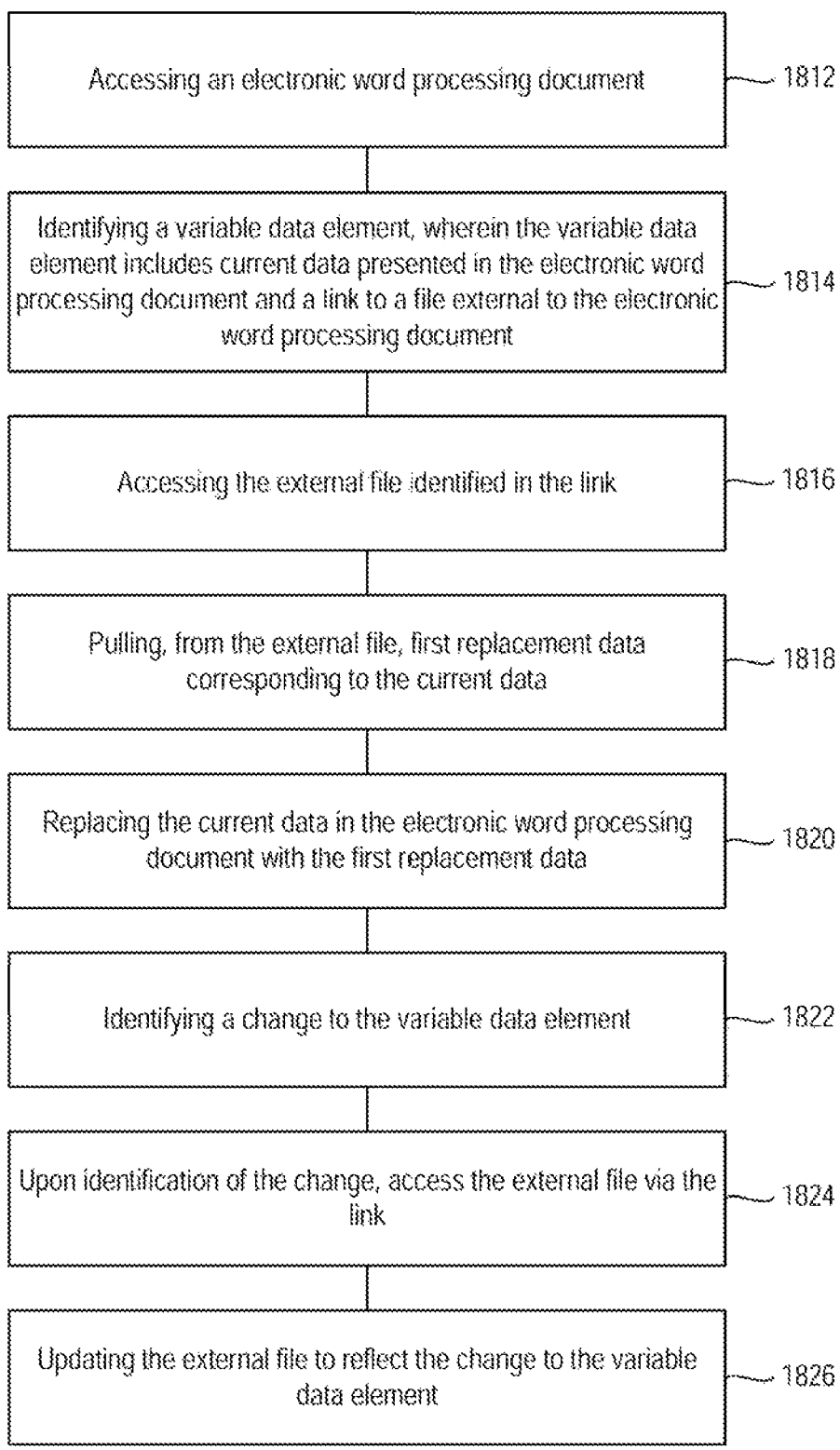
FIG. 18 illustrates a block diagram of an example process for automatically updating an electronic word processing document based on a change in a linked file and vice versa, consistent with some embodiments of the present disclosure.

FIG. 18 illustrates a block diagram of an example process 1810 automatically updating an electronic word processing document based on a change in a linked file and vice versa. While the block diagram may be described below in connection with certain implementation embodiments presented in other figures, those implementations are provided for illustrative purposes only, and are not intended to serve as a limitation on the block diagram. In some embodiments, the process 1810 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 11 to 17B by way of example. In some embodiments, some aspects of the process 1810 may be implemented as software (e.g., program codes or instructions) that are stored in a memory (e.g., the memory portion 122 in FIG. 1) or a non-transitory computer-readable medium. In some embodiments, some aspects of the process 1810 may be implemented as hardware (e.g., a specific-purpose circuit). In some embodiments, the process 1810 may be implemented as a combination of software and hardware.

FIG. 18 includes process blocks 1812 to 1826. At block 1812, a processing means (e.g., any type of processor described herein or that otherwise performs actions on data) may access an electronic word processing document, consistent with some embodiments of the present disclosure.

At block 1814, the processing means may identify a variable data element. The variable data element may include current data presented in the electronic word processing document and a link to a file external to the electronic word processing document, as discussed above.

At block 1816, the processing means may access an external file identified in the link, as previously discussed in the disclosure above.

At block 1818, the processing means may pull, from the external file, first replacement data corresponding to the current data, as previously discussed above.

At block 1820, the processing means may replace the current data in the electronic word processing document with the first replacement data, as previously discussed above.

At block 1822, the processing means may identify a change to the variable data element present, as previously discussed above.

At block 1824, the processing means may, upon identification of the change, access the external file via the link, as previously discussed above.

At block 1826, the processing means may update the external file to reflect the change to the variable data element, as previously discussed above.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fill within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

accessing an electronic word processing document;
presenting an interface enabling selection of a live application, outside the electronic word processing document, for embedding in the electronic word processing document;
embedding, in-line with text of the electronic word processing document, a live active icon representative of the live application;
presenting, in a first viewing mode, the live active icon;
wherein during the first viewing mode, the live active icon is displayed embedded in-line with the text, and the live active icon dynamically changes based on occurrences outside the electronic word processing document;
receiving a selection of the live active icon;
in response to the selection, presenting in a second viewing mode, an expanded view of the live application;
receiving a collapse instruction;
in response to the collapse instruction, reverting from the second viewing mode to the first viewing mode;
embedding, in-line with text by sizing the live active icon to correspond to an in-line text font size;
wherein in the first viewing mode the live active icon has an appearance corresponding to imagery present in the expanded view;
presenting the second viewing mode in an iframe;
wherein the interface is configured to enable selection of abridged information for presentation in the first viewing mode;
wherein the interface includes a permission tool for enabling selective access restriction to at least one of the live active icon or the expanded view;
wherein the live active icon includes an animation that plays in-line with the text during the first viewing mode;
accessing the electronic word processing document;
identifying in the electronic word processing document a variable data element;

wherein the variable data element includes current data presented in the electronic word processing document and a link to a file external to the electronic word processing document;

accessing the external file identified in the link;

pulling, from the external file, first replacement data corresponding to the current data;

replacing the current data in the electronic word processing document with the first replacement data;

identifying a change to the variable data element in the electronic word processing document;

upon identification of the change, accessing the external file via the link;

updating the external file to reflect the change to the variable data element in the electronic word processing document;

wherein the current data includes text of the electronic word processing document and the link includes metadata associated with the text;

presenting an interface in the electronic word processing document for enabling designation of document text as the variable data element and for enabling designation of a file as a source of the replacement data;

displaying an interface for enabling permissions to be set on the variable data element and to thereby restrict modifications thereto;

wherein the external file is an additional electronic word processing document;

transmitting a message to a designated entity when the variable data element is changed; and receiving a selection of the variable data element and to present in an iframe information from the external file.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for automatically updating an electronic word processing document based on a change in a linked file and vice versa, the system comprising:
at least one processor configured to:
access the electronic word processing document;
identity in the electronic word processing document a variable data element, wherein the variable data element includes current data presented in the electronic word processing document and a link to a file external to the electronic word processing document;
access the external file identified in the link;
pull, from the external file, first replacement data corresponding to the current data;
replace the current data in the electronic word processing document with the first replacement data;
in response to a triggering event, evaluate a value of data corresponding to the variable data element in the electronic word processing document to identify a change, wherein the triggering event includes a passage of an established time interval;
upon identification of the change, access the external file via the link; and
update the external file to reflect the change to the variable data element in the electronic word processing document.

2. The system of claim 1, wherein the current data includes text of the electronic word processing document and the link includes metadata associated with the text.

3. The system of claim 1, wherein the at least one processor is further configured to present an interface in the electronic word processing document for enabling designation of document text as the variable data element and for enabling designation of a file as a source of the replacement data.

4. The system of claim 1, wherein the at least one processor is configured to display an interface for enabling permissions to be set on the variable data element and to thereby restrict modifications thereto.

5. The system of claim 1, wherein the external file is an additional electronic word processing document.

6. The system of claim 1, wherein the at least one processor is configured to transmit a message to a designated entity when the variable data element is changed.

7. The system of claim 1, wherein the at least one processor is configured to receive a selection of the variable data element and to present in an iframe information from the external.

8. The system of claim 1, wherein the current data includes an audio file present in the electronic word processing document and the link includes metadata associated with the audio file.

9. The system of claim 1, wherein the current data includes a video file present in the electronic word processing document and the link includes metadata associated with the video file.

10. The system of claim 1, wherein the established time interval starts when the electronic word processing document is opened.

11. The system of claim 1, wherein the established time interval starts when the electronic word processing document is saved.

12. A non-transitory computer readable medium containing instructions that when executed by at least one processor cause the at least one processor to perform operations for automatically updating an electronic word processing document based on a change in a linked file and vice versa, the operations comprising:
accessing the electronic word processing document;
identifying in the electronic word processing document a variable data element, wherein the variable data element includes current data presented in the electronic word processing document and a link to a file external to the electronic word processing document;
accessing the external file identified in the link;
pulling, from the external file, first replacement data corresponding to the current data;
replacing the current data in the electronic word processing document with the first replacement data;
in response to a triggering event, evaluating a value of data corresponding to the variable data element in the electronic word processing document to identify a change, wherein the triggering event includes a passage of an established time interval;
upon identification of change, accessing the external file via the link; and
updating the external file to reflect the change to the variable data element in the electronic word processing document.

13. The non-transitory computer readable medium of claim 12, wherein the current data includes text of the electronic word processing document and the link includes metadata associated with the text.

14. The non-transitory computer readable medium of claim 12, wherein the operations further include presenting an interface in the electronic word processing document for enabling designation of document text as the variable data element and for enabling designation of a file as a source of the replacement data.

15. The non-transitory computer readable medium of claim 12, wherein the operations further include displaying an interface for enabling permissions to be set on the variable data element and to thereby restrict modifications thereto.

16. The non-transitory computer readable medium of claim 12, wherein the external file is an additional electronic word processing document.

17. The non-transitory computer readable medium of claim 12, wherein operations further include transmitting a message to a designated entity when the variable data element is changed.

18. The non-transitory computer readable medium of claim 12, wherein the operations further include receiving a selection of the variable data element and to present in an iframe information from the external file.

19. A method for automatically updating an electronic word processing document based on a change in a linked file and vice versa automatically updating an electronic word processing document based on a change in the linked file and vice versa, the method comprising:
accessing the electronic word processing document;
identifying in the electronic word processing document a variable data element, wherein the variable data element includes current data presented in the electronic word processing document and a link to a file external to the electronic word processing document;
accessing the external file identified in the link;
pulling, from the external file, first replacement data corresponding to the current data;
replacing the current data in the electronic word processing document with the first replacement data;

in response to a triggering event, evaluating a value of data corresponding to the variable data element in the electronic word processing document to identify a change, wherein the triggering event includes a passage of an established time interval;

upon identification of the change, accessing the external file via the link; and updating the external file to reflect the change to the variable data element in the electronic word processing document.

20. The method of claim 19; wherein the current data includes text of the electronic word processing document and the link includes metadata associated with the text.

21. The method of claim 19, the method further comprising presenting an interface in the electronic word processing document for enabling designation of document text as the variable data element and for enabling designation of a file as a source of the replacement data.

22. The method of claim 19, the method further comprising displaying an interface for enabling permissions to be set on the variable data element and to thereby restrict modifications thereto.

23. The method of claim 19, the method further comprising transmitting a message to a designated entity when the variable data element is changed.

24. The method of claim 19, the method further comprising receiving a selection of the variable data element and to present in an iframe information from the external file.

25. The system of claim 1, wherein the at least one processor is configured to transmit a message to a designated entity when the change to the variable data element meets a change threshold established by a user.

* * * * *